(12) United States Patent
Kyotani et al.

(10) Patent No.: US 11,899,387 B2
(45) Date of Patent: Feb. 13, 2024

(54) IMAGE-FORMING DEVICE PERFORMING PRINTING PROCESS ACCORDING TO MODE SWITCHED BETWEEN NORMAL PRINTING MODE AND EXTENDED PRINTING MODE

(71) Applicant: BROTHER KOGYO KABUSHIKI KAISHA, Nagoya (JP)

(72) Inventors: Tadao Kyotani, Nagoya (JP); Takashi Suzuki, Nagoya (JP); Shingo Fujiwara, Nagoya (JP); Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 43 days.

(21) Appl. No.: 17/370,110

(22) Filed: Jul. 8, 2021

(65) Prior Publication Data
US 2021/0341869 A1    Nov. 4, 2021

Related U.S. Application Data

(63) Continuation of application No. PCT/JP2019/042788, filed on Oct. 31, 2019.

(30) Foreign Application Priority Data

Jan. 15, 2019    (JP) .................. 2019-004290

(51) Int. Cl.
| | | |
|---|---|---|
| G03G 15/00 | (2006.01) | |
| G06K 15/00 | (2006.01) | |
| G06K 15/14 | (2006.01) | |

(52) U.S. Cl.
CPC .......... *G03G 15/556* (2013.01); *G03G 15/50* (2013.01); *G06K 15/002* (2013.01); *G06K 15/14* (2013.01); *G06K 15/4075* (2013.01)

(58) Field of Classification Search
CPC .... G03G 15/556; G03G 15/50; G06K 15/002; G06K 15/14; G06K 15/4075; B41J 29/00; B41J 29/38
See application file for complete search history.

(56) References Cited

U.S. PATENT DOCUMENTS

| | | | |
|---|---|---|---|
| 5,008,711 | A | 4/1991 | Sakamoto et al. |
| 2001/0004423 | A1* | 6/2001 | Kakeshita .......... G03G 21/1889 399/24 |

(Continued)

FOREIGN PATENT DOCUMENTS

| | | |
|---|---|---|
| JP | 64-026865 A | 1/1989 |
| JP | 2007-178579 A | 7/2007 |

(Continued)

OTHER PUBLICATIONS

International Preliminary Report on Patentability issued in corresponding International Patent Application No. PCT/JP2019/042788, dated Jul. 29, 2021.

(Continued)

*Primary Examiner* — David J Bolduc
(74) *Attorney, Agent, or Firm* — Merchant & Gould P.C.

(57) ABSTRACT

In an image-forming device, a drum cartridge and a developing cartridge are detachably attached to a frame. A controller is configured to perform: a drum replacement necessity determination process; and a mode switch process. The drum replacement necessity determination process determines, based on life information for the drum cartridge, whether replacement of the drum cartridge is necessary. The mode switch process switches a mode of a printing process between a normal printing mode and an extended printing mode. The normal printing mode allows the image-forming device to perform the printing process when the replacement of the drum cartridge is determined to be unnecessary. The extended printing mode allows the image-forming device to (Continued)

perform the printing process on a condition that the developing cartridge attached to the frame is not replaced with another developing cartridge in a state where the replacement of the developing cartridge is necessary.

19 Claims, 14 Drawing Sheets

(56) References Cited

U.S. PATENT DOCUMENTS

| | | | | |
|---|---|---|---|---|
| 2001/0043259 | A1* | 11/2001 | Ogata | G03G 15/0856 |
| | | | | 399/53 |
| 2001/0055493 | A1* | 12/2001 | Asanuma | G03G 21/1878 |
| | | | | 399/25 |
| 2002/0025173 | A1* | 2/2002 | Isobe | G03G 21/1892 |
| | | | | 399/27 |
| 2004/0001722 | A1 | 1/2004 | Nezu | |
| 2004/0131370 | A1* | 7/2004 | Yamauchi | G03G 21/1889 |
| | | | | 399/24 |
| 2006/0285132 | A1 | 12/2006 | Kwon | |
| 2007/0146398 | A1 | 6/2007 | Igarashi et al. | |
| 2010/0135693 | A1 | 6/2010 | Okabe et al. | |
| 2012/0163839 | A1 | 6/2012 | Oda | |
| 2012/0230730 | A1* | 9/2012 | Ogino | G03G 15/553 |
| | | | | 399/119 |
| 2013/0045017 | A1* | 2/2013 | Hayakawa | G03G 21/1878 |
| | | | | 399/24 |
| 2015/0234335 | A1 | 8/2015 | Nakamoto et al. | |
| 2019/0041786 | A1* | 2/2019 | Shinagawa | H04N 1/00962 |
| 2020/0033790 | A1* | 1/2020 | Sano | G03G 15/0848 |
| 2020/0073306 | A1* | 3/2020 | Sakaguchi | G03G 21/1875 |
| 2020/0387083 | A1* | 12/2020 | Nakase | G03G 15/553 |
| 2021/0149322 | A1* | 5/2021 | Kaneko | G03G 15/553 |
| 2021/0149331 | A1* | 5/2021 | Kyotani | G03G 15/556 |

FOREIGN PATENT DOCUMENTS

| | | |
|---|---|---|
| JP | 2010-128336 A | 6/2010 |
| JP | 2010-250227 A | 11/2010 |
| JP | 2012-141369 A | 7/2012 |
| JP | 2013-050601 A | 3/2013 |
| JP | 2015-152761 A | 8/2015 |

OTHER PUBLICATIONS

Office Action issued in corresponding Japanese Patent Application No. 2019-004290 dated Oct. 4, 2022.

International Search Report and Written Opinion issued in PCT/JP2019/042788, dated Jan. 21, 2020.

* cited by examiner

FIG. 14

| USER PRESET RECEPTION SCREEN |
|---|
| Always allow a transition to the normal extended mode when the transition to the normal extended mode is presented.<br>☐ ON<br>☐ OFF<br><br>Always allow a transition to the limited extended mode when the transition to the limited extended mode is presented.<br>☐ ON<br>☐ OFF |

IMAGE-FORMING DEVICE PERFORMING PRINTING PROCESS ACCORDING TO MODE SWITCHED BETWEEN NORMAL PRINTING MODE AND EXTENDED PRINTING MODE

CROSS REFERENCE TO RELATED APPLICATION

This application is a by-pass continuation application of International Application No. PCT/JP2019/042788 filed Oct. 31, 2019 claiming priority from Japanese Patent Application No. 2019-004290 filed Jan. 15, 2019. The entire contents of the international application and the priority application are incorporated herein by reference.

TECHNICAL FIELD

The present disclosure relates to an image-forming device, a non-transitory computer readable storage medium storing computer-readable instructions, and a method for controlling the image-forming device.

BACKGROUND

Electrophotographic image-forming devices such as LED printers are well known in the art. This type of image-forming device has a device body, and a drum cartridge and a developing cartridge that can be attached to and detached from the device body.

In the conventional image-forming device described above, the developing cartridge and the drum cartridge are detachably attached to the device body in a state where the developing cartridge is attached to the drum cartridge. Both the developing cartridge and the drum cartridge are replaceable consumables. The conventional image-forming device described above also has life determining means and a notification unit. The life determining means determines the end-of-life of the drum cartridge. The notification unit issues a message indicating that the drum cartridge is at end-of-life when the life determining means determines that the drum cartridge is at end-of-life. As a result, the user can recognize the need to replace the drum cartridge.

The conventional image-forming device described above also includes toner consumption estimating means that estimates a quantity of toner consumption.

SUMMARY

However, in some cases the conventional image-forming device described above may first issue a notification that the developing cartridge is at end-of-life and, after a short amount of time, issue a notification that the drum cartridge is at end-of-life. Since the developing cartridge and the drum cartridge are replaced at different timings in this case, a new developing cartridge and a new drum cartridge must be ordered with great frequency, for example, imposing excess labor or burden on the user. There is also an increase in shipping costs when ordering each cartridge individually.

In view of the foregoing, it is an object of the present disclosure to provide a technology capable of reducing the user's labor and burden for replacing consumable cartridges.

In order to attain the above and other objects, the present disclosure provides an image-forming device including: a frame; a drum cartridge; a developing cartridge; and a controller. The drum cartridge is detachably attached to the frame. The drum cartridge has a photosensitive drum. The developing cartridge is detachably attached to the frame. The developing cartridge has a housing. The housing is configured to accommodate therein toner. The controller is configured to control the image-forming device to perform a printing process. The controller is configured to perform: a drum replacement necessity determination process; and a mode switch process. The drum replacement necessity determination process is to determine, based on life information for the drum cartridge, whether replacement of the drum cartridge is necessary. The mode switch process is to switch a mode of the printing process between a normal printing mode and an extended printing mode. The normal printing mode allows the image-forming device to perform the printing process when the replacement of the drum cartridge is determined to be unnecessary in the drum replacement necessity determination process. The extended printing mode allows the image-forming device to perform the printing process on a condition that the developing cartridge attached to the frame is not replaced with another developing cartridge in a state where the replacement of the developing cartridge is necessary.

According to another aspect, the present disclosure also provides a non-transitory computer readable storage medium storing computer-readable instructions. The computer-readable instructions are executed by a controller included in or provided outside an image-forming device. The image-forming device includes: a frame; a drum cartridge; and a developing cartridge. The drum cartridge is detachably attached to the frame. The drum cartridge has a photosensitive drum. The developing cartridge is detachably attached to the frame. The developing cartridge has a housing. The housing is configured to accommodate therein toner. The computer-readable instructions, when executed by the controller, cause the image-forming device to perform a printing process according to a mode. The computer-readable instructions cause the controller to perform: a drum replacement necessity determination process; and a mode switch process. The drum replacement necessity determination process is to determine, based on life information for the drum cartridge, whether replacement of the drum cartridge is necessary. The mode switch process is to switch the mode of the printing process between a normal printing mode and an extended printing mode. The normal printing mode allows the image-forming device to perform the printing process when the replacement of the drum cartridge is determined to be unnecessary in the drum replacement necessity determination process. The extended printing mode allows the image-forming device to perform the printing process on a condition that the developing cartridge attached to the frame is not replaced with another developing cartridge in a state where the replacement of the developing cartridge is necessary.

According to still another aspect, the present disclosure also provides a method for controlling an image-forming device to perform a printing process according to a mode. The image-forming device includes: a frame; a drum cartridge; and a developing cartridge. The drum cartridge is detachably attached to the frame. The drum cartridge has a photosensitive drum. The developing cartridge is detachably attached to the frame. The developing cartridge has a housing. The housing is configured to accommodate therein toner. The method includes: determining; and switching. The determining determines, based on life information for the drum cartridge, whether replacement of the drum cartridge is necessary. The switching switches the mode of the printing process between a normal printing mode and an extended printing mode. The normal printing mode allows the image-forming device to perform the printing process when the replacement of the drum cartridge is determined to be unnecessary in the determining. The extended printing mode allows the image-forming device to perform the printing process on a condition that the developing cartridge attached to the frame is not replaced with another developing cartridge in a state where the replacement of the developing cartridge is necessary.

BRIEF DESCRIPTION OF THE DRAWINGS

The particular features and advantages of the disclosure as well as other objects will become apparent from the following description taken in connection with the accompanying drawings, in which:

FIG. 14 illustrates an example of a selection screen displayed on a display of an image-forming device when a user preset reception process is executed by a controller of the image-forming device according to a first modification of the present disclosure.

DETAILED DESCRIPTION

Below, an embodiment of the present disclosure will be described while referring to the accompanying drawings.

1. Embodiment

<1-1. Structure of an Image-Forming Device>

Figure 1:
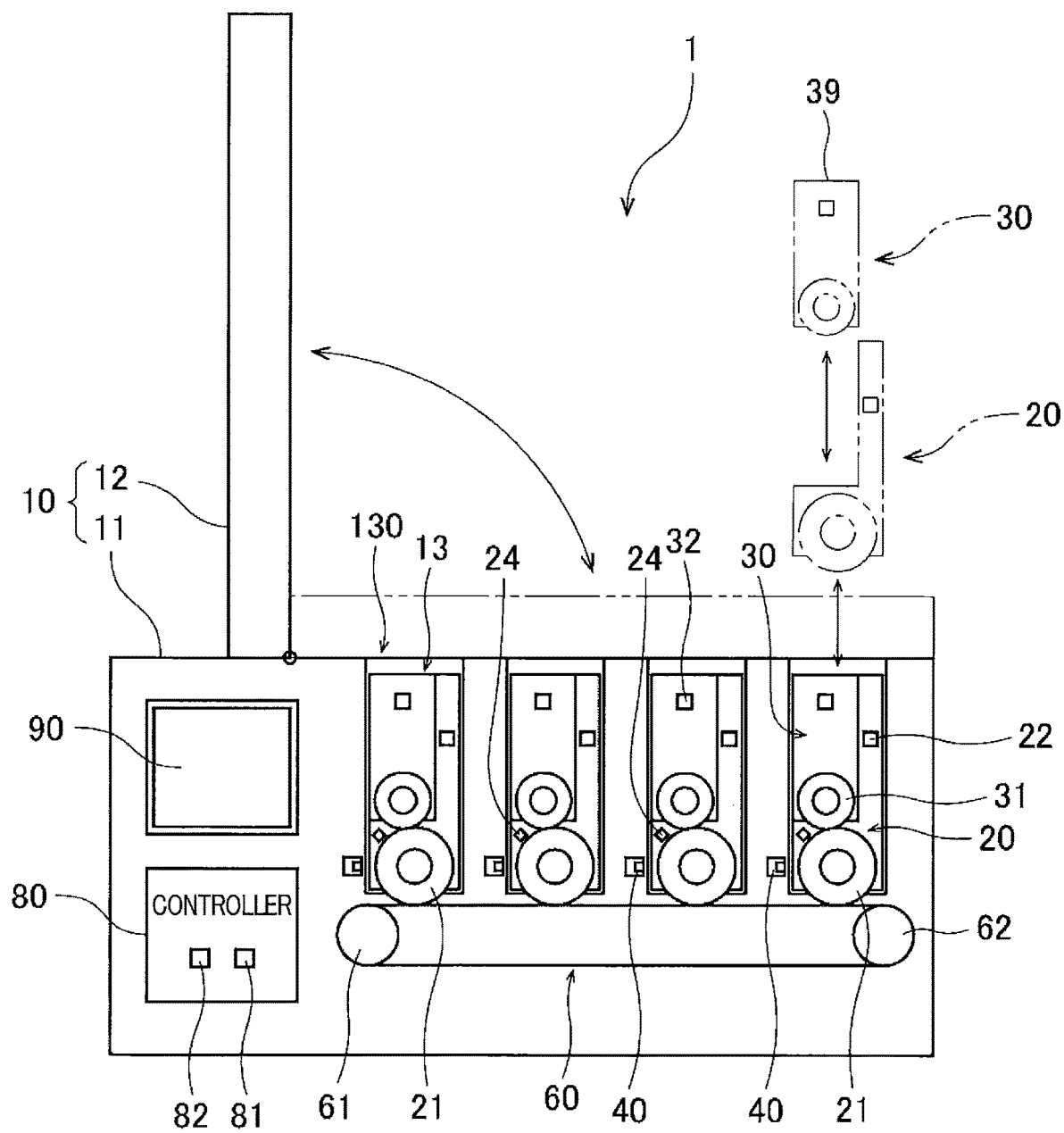
FIG. 1 is a schematic diagram of an image-forming device according to an embodiment of the present disclosure.

FIG. 1 is a schematic diagram of an image-forming device 1. The image-forming device 1 is an electrophotographic printer. Some examples of the image-forming device 1 include a laser printer and an LED printer. As illustrated in FIG. 1, the image-forming device 1 includes a casing 10, four drum cartridges 20, four developing cartridges 30, four light source units 40, a transfer belt 60, a controller 80, and a display 90.

The casing 10 has a frame 11, and a cover 12. The four drum cartridges 20, the four developing cartridges 30, the four light source units 40, the transfer belt 60, and the controller 80 are accommodated in the casing 10. Further, the display 90 is positioned at the outer surface of the casing 10. The frame 11 has four cartridge holding units 13. Each cartridge holding unit 13 has an opening 130. The cover 12 can rotate between a closed position depicted with a two-dot chain line in FIG. 1, and an open position depicted with a solid line in FIG. 1. The cover 12 covers the four openings 130 when positioned at the closed position. The four openings 130 are open when the cover 12 is positioned at the open position.

The drum cartridge 20 can be attached to and detached from the cartridge holding unit 13 in a state where the developing cartridge 30 is attached to the drum cartridge 20. Put another way, a process cartridge configured of the developing cartridge 30 attached to the drum cartridge 20 can be attached to and detached from the cartridge holding unit 13.

The drum cartridge 20 has a photosensitive drum 21. The photosensitive drum 21 is a cylindrical-shaped member. The photosensitive drum 21 is rotatable about a drum shaft. The outer surface of the photosensitive drum 21 is coated with a photosensitive material. The drum cartridge 20 has a charger 24. The charger 24 extends parallel to the drum shaft of the photosensitive drum 21. Power is supplied to the chargers 24 from the image-forming device 1. The drum cartridge 20 also has a drum memory 22. The drum memory 22 is a storage medium that allows reading and writing of information. For example, the drum memory 22 may be a flash ROM or an EEPROM.

The drum memory 22 stores information related to the drum cartridge 20. Specifically, the drum memory 22 stores at least one of drum identification information capable of identifying an individual drum cartridge 20, drum life information, and various information affecting the life of the drum cartridge 20. The drum identification information is a serial number, for example. The drum life information is at least one of the cumulative number of rotations of the photosensitive drum 21, and the cumulative number of pages printed using the photosensitive drum 21. In the present embodiment, both of these types of information are stored in the drum memory 22 as the drum life information. As information affecting the life of the photosensitive drum 21, the drum memory 22 in the present embodiment stores the cumulative number of detected discharge abnormalities in the charger 24 that charges the photosensitive drum 21, the cumulative number of pages printed using a developing cartridge 30 whose identification information does not match prescribed information, the cumulative number of pages printed in a high-temperature high-humidity environment, the cumulative number of pages printed in a low-temperature low-humidity environment, the cumulative number of paper jam occurrences, and the cumulative number of duplex prints.

The developing cartridge 30 can be attached to and detached from the drum cartridge 20. The developing cartridge 30 has a housing 39 capable of accommodating toner, which is the developer. The four developing cartridges 30 accommodate toner in uniquely different colors (the colors cyan, magenta, yellow, and black, for example). The developing cartridge 30 in the present embodiment also has a developing roller 31. The developing roller 31 is a cylindrical-shaped member. The developing roller 31 is rotatable about a developing-roller shaft. When the developing cartridge 30 is attached to the drum cartridge 20, the outer circumferential surface of the photosensitive drum 21 contacts the outer circumferential surface of the developing roller 31. The developing cartridge 30 also has a toner memory 32. The toner memory 32 is a storage medium that allows reading and writing of information. For example, the toner memory 32 is a flash ROM or an EEPROM.

The toner memory 32 stores at least one of toner identification information capable of identifying an individual developing cartridge 30, and toner life information. The toner identification information is a serial number, for example. A variety of known information capable of determining a replacement time for the developing cartridge 30 may be employed as the toner life information. The toner life information may be at least one of the cumulative number of rotations of the developing roller 31, the cumulative number of pages printed with the developing roller 31, and the cumulative number of output dots, for example.

When a drum cartridge 20 is attached to the frame 11, the light source unit 40 faces the surface of the photosensitive drum 21. The light source unit 40 is attached to the frame 11 or the cover 12. The light source unit 40 has a plurality of light sources. The plurality of light sources is arrayed parallel to the drum shaft of the photosensitive drum 21. The light sources can irradiate light onto the outer circumferential surface of the photosensitive drum 21. The light sources are LEDs (light-emitting diodes), for example.

The light source units 40 are electrically connected to the controller 80. The controller 80 controls the plurality of light sources of the light source units 40 to emit light in accordance with inputted image data. Accordingly, the light sources emit light toward the outer circumferential surfaces of the photosensitive drums 21. As a result, the photosensitive material on the outer circumferential surfaces of the photosensitive drums 21 is exposed in accordance with the image data. Note that the configuration of the light source units is not limited to a plurality of light sources arrayed parallel to the drum shaft of the photosensitive drum 21. As an alternative, the configuration of the light source units 40 may include a light source (laser light-emitting unit), a polygon mirror, lenses, and reflecting mirrors.

The transfer belt 60 contacts the photosensitive drums 21. The transfer belt 60 may have a loop (endless belt) shape. The outer circumferential surfaces of the photosensitive drums 21 contact the outer surface of the transfer belt 60. During a printing process, printing paper fed by the rotation of a plurality of conveying rollers (not illustrated) is conveyed between the transfer belt 60 and the photosensitive drums 21. A drive roller 61 drives the transfer belt 60. The controller 80 rotates the conveying rollers described above and the drive roller 61. A follow roller 62 rotates along with the movement of the transfer belt 60 accompanying the drive of the drive roller 61. The combination of the conveying rollers described above, the drive roller 61, and the transfer belt 60 corresponds to the "conveying mechanism" of the present embodiment.

The controller 80 has a processor 81, such as a CPU and the like, and a device memory 82. The device memory 82 is a storage medium that allows the reading and writing of information. For example, the device memory 82 may be a flash ROM or an EEPROM. As illustrated in FIG. 1, the device memory 82 is positioned in the controller 80 in the present embodiment, but the device memory 82 may be positioned outside the controller 80 instead.

The device memory 82 stores a computer program for controlling operations of the image-forming device 1. Additionally, the device memory 82 may store the drum identification information, the drum life information, the various information affecting the life of the photosensitive drum 21, the toner identification information, and the toner life information. The processor 81 executes various processes according to the computer program stored in the device memory 82. As will be described later, the processor 81 executes a drum replacement necessity determination process, a mode switch process, a toner identification information acquisition process, a latest toner identification information acquisition process, an extended printing mode possibility determination process, a user selection reception process, a print request reception process, an extended printing command process, a determination process, and an extended mode determination process.

The display 90 displays information related to the operations of the image-forming device 1, errors (warnings) that occur, and the like in accordance with commands from the controller 80. The display 90 is electrically connected to the controller 80.

Figure 2:
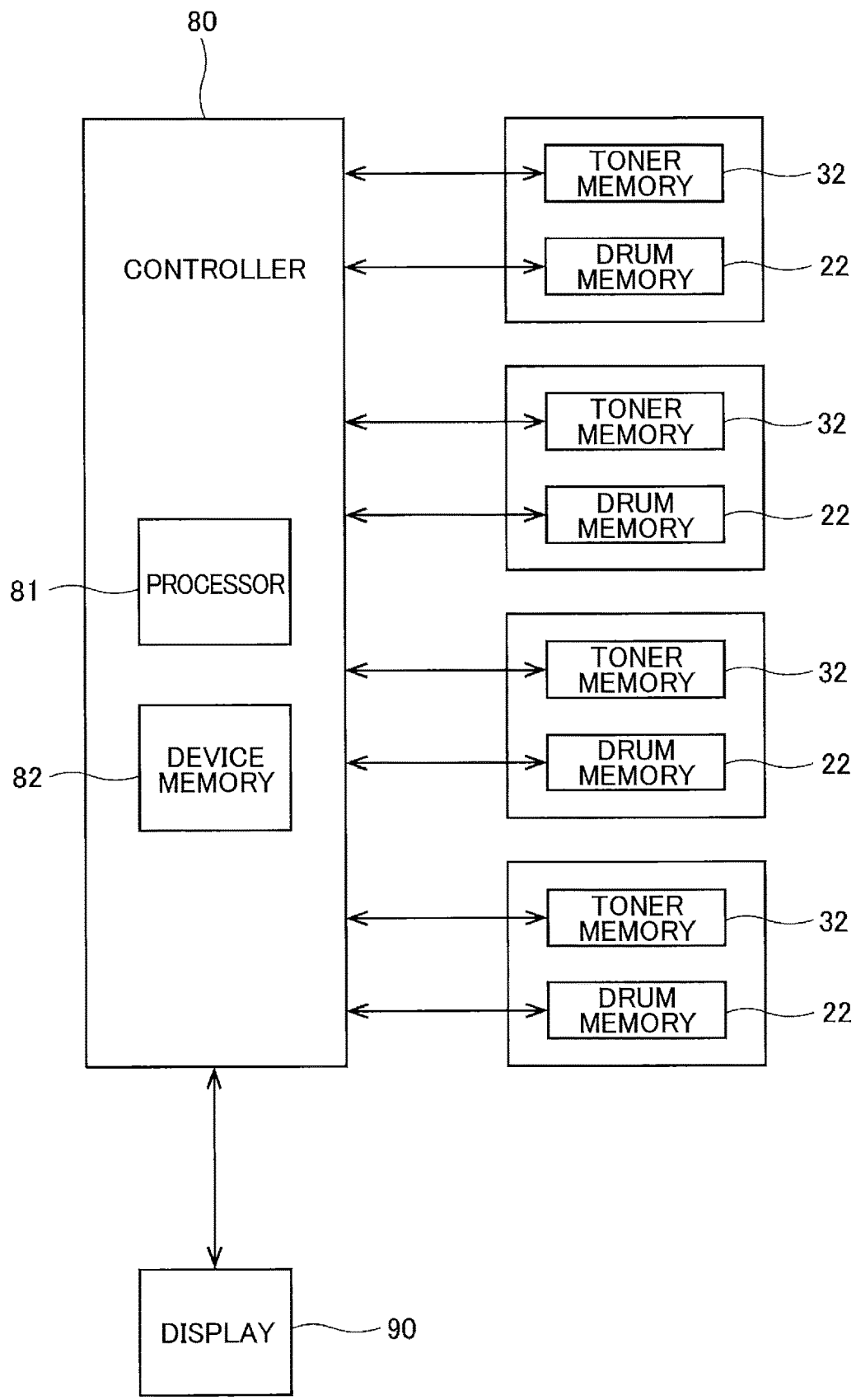
FIG. 2 is a block diagram illustrating an electric configuration of the image-forming device according to the embodiment of the present disclosure.

FIG. 2 illustrates electrical connections between the controller 80 and the drum memories 22 and toner memories 32 when drum cartridges 20 to which developing cartridges 30 are respectively attached are attached to the frame 11. FIG. 2 also illustrates the connection between the controller 80 and the display 90. When a drum cartridge 20 to which a developing cartridge 30 is attached is attached to the frame 11, the drum memory 22 is electrically connected to the controller 80 via an electrical drum connector in the frame 11. This connection enables the processor 81 to read information from and write information to the drum memory 22. Further, when the drum cartridge 20 to which the developing cartridge 30 is attached is attached to the frame 11, the toner memory 32 of the developing cartridge 30 is electrically connected to the controller 80 via an electrical toner connector in the frame 11. This connection enables the processor 81 to read information from and write information to the toner memory 32. Note that the toner memory 32 may instead be electrically connected to the controller 80 via the drum memory 22.

The controller 80 drives a motor not illustrated in the drawings when executing a printing process. The drive force of this motor rotates the photosensitive drums 21 and the developing rollers 31. The controller 80 also supplies power to the chargers 24, which charge the surfaces of the photosensitive drums 21. Additionally, the controller 80 controls the light sources of the light source units 40 to emit light. The light from the light sources is irradiated onto the outer circumferential surfaces of the photosensitive drums 21, forming electrostatic latent images on the outer circumferential surfaces of the photosensitive drums 21 for the images being printed. Toner in the developing cartridges 30 is supplied via the developing rollers 31 onto the electrostatic latent images formed on the photosensitive drums 21, forming toner images on the outer circumferential surfaces of the photosensitive drums 21. Thereafter, printing paper is conveyed between the photosensitive drums 21 and the transfer belt 60, and the toner images are transferred from the outer circumferential surfaces of the photosensitive drums 21 onto the printing paper. The printing paper is conveyed to a fixing unit in the image-forming device 1 in a state where the toner images are transferred onto the printing paper. The fixing unit thermally fixes the transferred toner images to the printing paper. As a result, images are printed on the printing paper.

The image-forming device 1 also has a temperature and humidity sensor not illustrated in the drawings. The controller 80 can determine whether the ambient temperature and humidity are high by comparing detection values outputted from the temperature and humidity sensor with preset threshold values. The controller 80 can also determine whether the ambient temperature and humidity are low by comparing the detection values outputted from the temperature and humidity sensor with other preset threshold values.

<1-2. Processes on the Image-Forming Device>

Next, processes executed by the controller 80 of the image-forming device 1 will be described with reference to FIGS. 3 through 14.

<1-2-1. Starting Up the Life Management Module>

Figure 3:
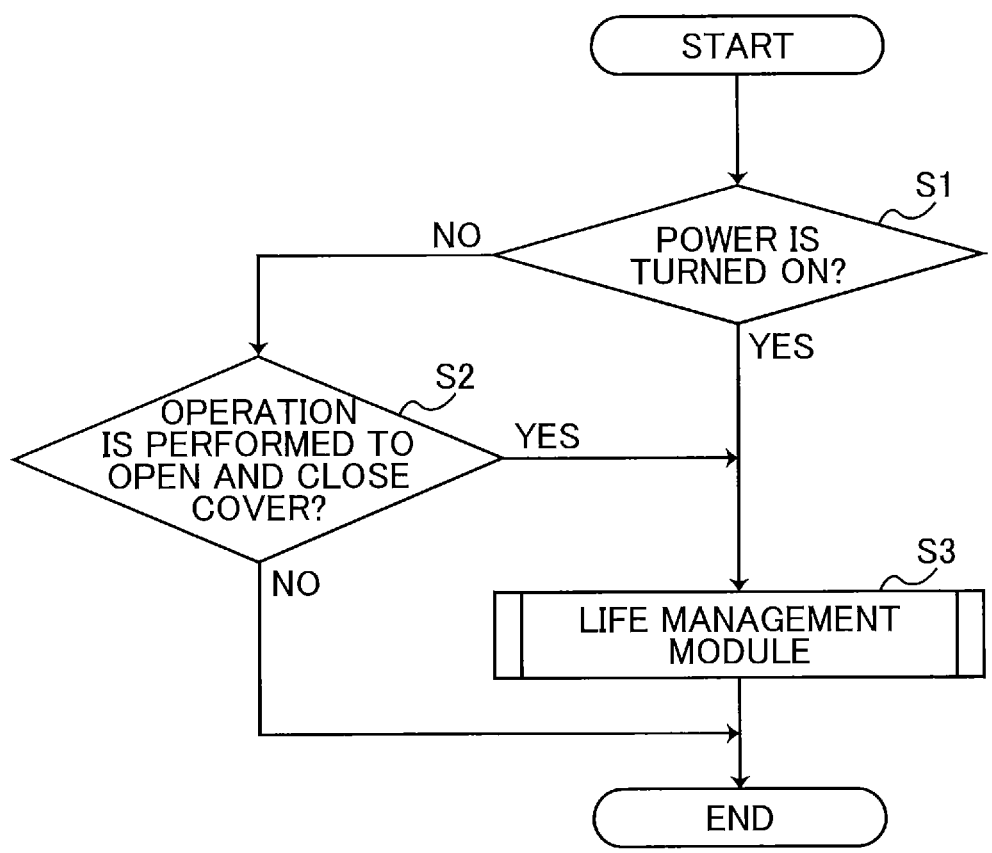
FIG. 3 is a flowchart illustrating steps in a process for starting up a life management module executed by a controller of the image-forming device according to the embodiment of the present disclosure.

FIG. 3 is a flowchart describing a process executed by the controller 80 for starting up a life management module. As illustrated in FIG. 3, the controller 80 continuously determines whether the power of the image-forming device 1 is turned on (step S1) or whether an operation is performed to open and close the cover 12 of the casing 10 (step S2). When the controller 80 determines that the power of the image-forming device 1 is turned on (step S1: YES) or that an operation is performed to open and close the cover 12 of the casing 10 (step S2: YES), in step S3 the controller 80 begins executing the life management module.

While the power of the image-forming device 1 is not turned on (step S1: NO) and an operation is not performed to open and close the cover 12 (step S2: NO), the controller 80 does not execute the life management module until the next time one of these operations is performed.

<1-2-2. Life Management Module>

Figure 4:
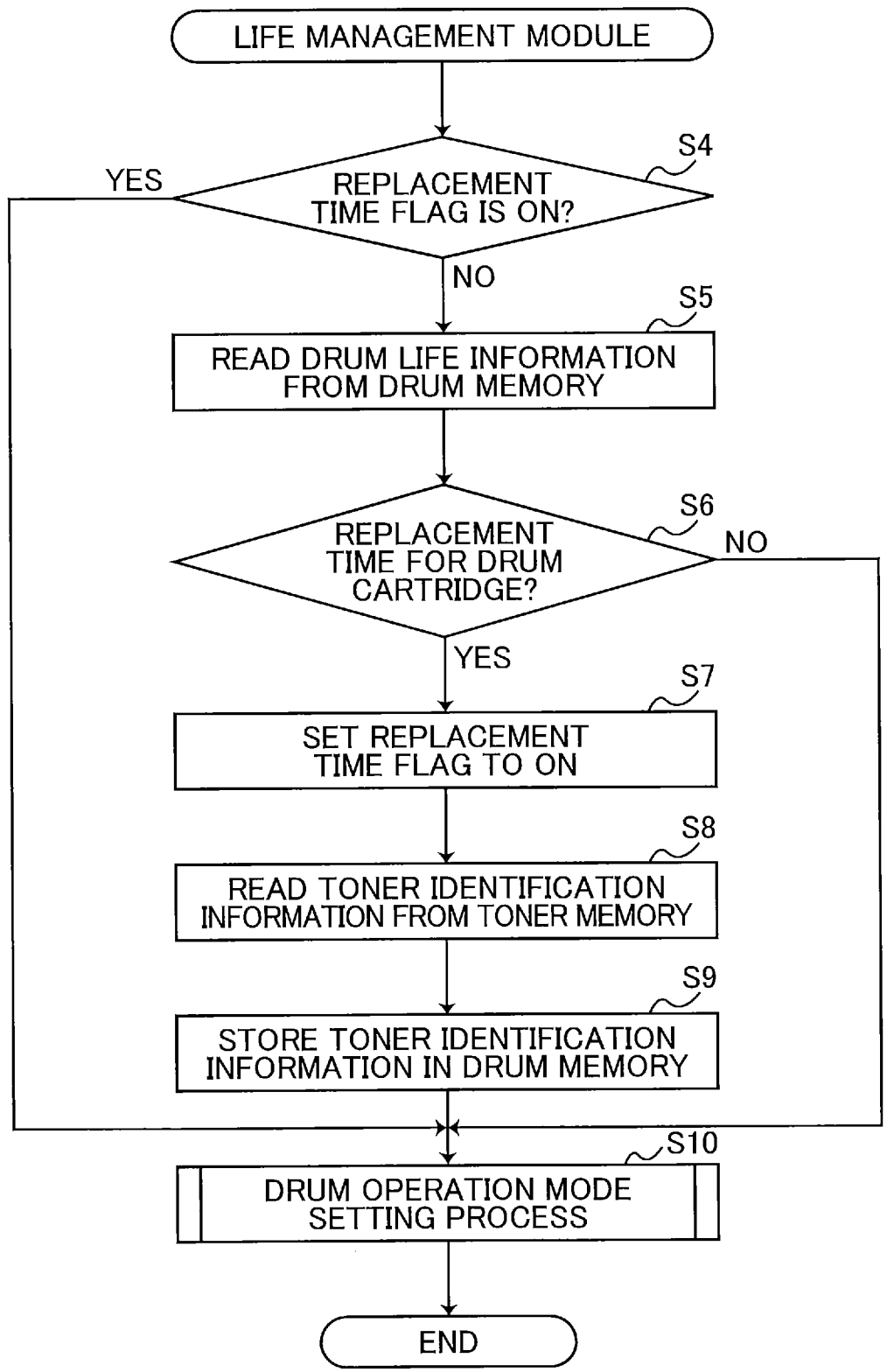
FIG. 4 is a flowchart illustrating steps in a life management module executed by the controller of the image-forming device according to the embodiment of the present disclosure.

Next, the life management module executed by the controller 80 will be described with reference to FIG. 4. FIG. 4 is a flowchart illustrating steps in the life management module executed by the controller 80.

To begin, in step S4 the controller 80 determines whether a replacement time flag is set to ON during a previous execution of the life management module. Specifically, the controller 80 makes the determination in step S4 by referencing information stored in the device memory 82. When the controller 80 determines that the replacement time flag is ON (step S4: YES), the controller 80 shifts to the process in step S10 without performing the following processes in steps S5 through S9. However, when the controller 80 determines that the replacement time flag is OFF (step S4: NO), the controller 80 performs the subsequent steps S5 through S9.

In step S5 the controller 80 communicates with the drum memory 22 and reads drum life information from the drum memory 22. More specifically, the controller 80 of the present embodiment reads the cumulative number of rotations of the photosensitive drum 21 and the cumulative number of pages printed with the photosensitive drum 21 from the drum memory 22 of the drum cartridge 20 attached to the frame 11.

After the controller 80 acquires this drum life information, in step S6 the controller 80 determines based on the life information for the drum cartridge 20 whether the drum cartridge 20 must be replaced. Put another way, the controller 80 uses the drum life information to determine whether the drum cartridge 20 has reached the replacement time therefor (drum replacement necessity determination process). In the present embodiment, the controller 80 determines that the drum cartridge 20 must be replaced (step S6: YES) when the cumulative number of rotations of the photosensitive drum 21 is greater than or equal to a first threshold value or the cumulative number of pages printed with the photosensitive drum 21 is greater than or equal to a second threshold value. On the other hand, the controller 80 determines that the drum cartridge 20 need not be replaced (step S6: NO) when both the cumulative number of rotations of the photosensitive drum 21 is less than or equal to the first threshold value and the cumulative number of pages printed with the photosensitive drum 21 is less than or equal to the second threshold value. The first threshold value is a value for determining whether the cumulative number of rotations of the photosensitive drum 21 has exceeded an upper limit. Similarly, the second threshold value is a value for determining whether the cumulative number of pages printed using the photosensitive drum 21 has exceeded an upper limit.

When the controller 80 determines that the drum cartridge 20 has reached the replacement time therefor (step S6: YES), in step S7 the controller 80 sets the replacement time flag to ON. Next, in step S8 the controller 80 reads toner identification information from the toner memory 32 attached to the frame 11 in order to identify the developing cartridge 30 that is attached to the frame 11 at the time of reaching the replacement time (toner identification information acquisition process) and in step S9 stores this toner identification information in the drum memory 22.

After storing the toner identification information read from the toner memory 32 in the drum memory 22, in step S10 the controller 80 shifts to a drum operating mode setting process described later in detail.

When the controller 80 determines that the drum cartridge 20 has not reached the replacement time therefor (step S6: NO), the controller 80 shifts to the drum operating mode setting process in step S10 without executing the processes in steps S7 through S9 described above.

<1-2-3. Drum Operating Mode Setting Process>

Figure 5:
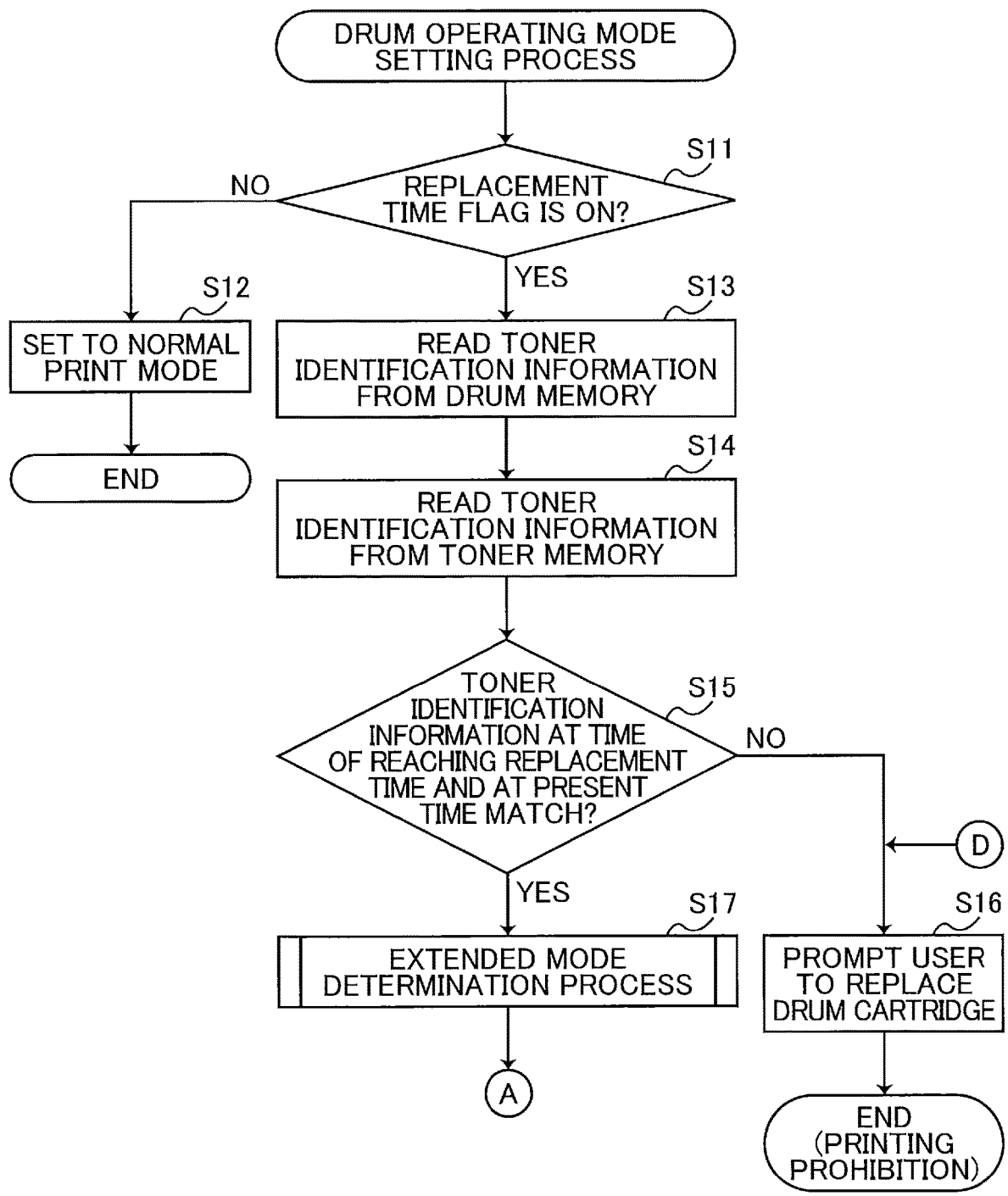
FIG. 5 is a flowchart illustrating steps in a drum operating mode setting process executed by the controller according to the embodiment of the present disclosure.

Next, the drum operating mode setting process executed by the controller 80 will be described with reference to FIGS. 5 through 8. FIG. 5 is a flowchart illustrating steps in the drum operating mode setting process executed by the controller 80.

To begin, in step S11 the controller 80 determines whether the replacement time flag is set to ON during a previous execution of the life management module. Specifically, the controller 80 performs the determination in step S11 by referencing information stored in the device memory 82. When the controller 80 determines that the replacement time flag is OFF (step S11: NO), in step S12 the controller 80 sets the mode used for performing printing processes to a normal printing mode. The normal printing mode controls the charger 24 to apply a normal charge bias and controls the conveying mechanism described above to convey printing paper at a normal feeding speed when a print request is issued. After executing step S12, the controller 80 controls the image-forming device 1 to execute a printing process according to the normal printing mode set above.

When the controller 80 determines in S11 that the replacement time flag is ON (step S11: YES), the controller 80 performs the following process in order to detect whether the developing cartridge 30 attached to the drum cartridge 20 has been replaced with a new cartridge.

That is, in step S13 the controller 80 communicates with the drum memory 22 and reads the toner identification information from the drum memory 22. From this information, the controller 80 identifies the developing cartridge 30 attached to the frame 11 at the time of reaching the replacement time. Next, in step S14 the controller 80 communicates with the toner memory 32 and reads toner identification information from the toner memory 32 (latest toner identification information acquisition process). From this information, the controller 80 identifies the developing cartridge 30 currently attached to the frame 11.

After completing the processes in steps S13 and S14, in step S15 the controller 80 determines whether the toner identification information acquired in the toner identification information acquisition process matches the toner identification information read in the latest toner identification information acquisition process (extended printing mode possibility determination process). Put another way, the controller 80 determines whether the developing cartridge 30 attached to the frame 11 at the time of reaching the replacement time has been replaced with a new developing cartridge 30.

When the toner identification information acquired at the time of reaching the replacement time and the toner identification information acquired at the present time do not match based on the results of the determination in step S15 (step S15: NO), it is not preferable to further extend the use of the drum cartridge 20 whose use has already exceeded its life. In this case, in step S16 the controller 80 prohibits execution of the printing process and prompts the user to replace the drum cartridge 20. Specifically, the controller 80 displays a specific message or image on the display 90 to notify the user that the drum cartridge 20 must be replaced.

On the other hand, when the toner identification information acquired at the time of reaching the replacement time and the toner identification information acquired at the present time match based on the results of the determination in step S15 (step S15: YES), then it may be preferable to allow printing processes as long as the developing cartridge 30 attached to the frame at the end-of-life of the drum cartridge 20 continues to be used. In this case, in step S17 the controller 80 shifts to an extended mode determination process in order to determine (select) the best mode for performing printing processes to extend the life of the drum cartridge 20.

<1-2-4. Extended Mode Determination Process>

Figure 9:
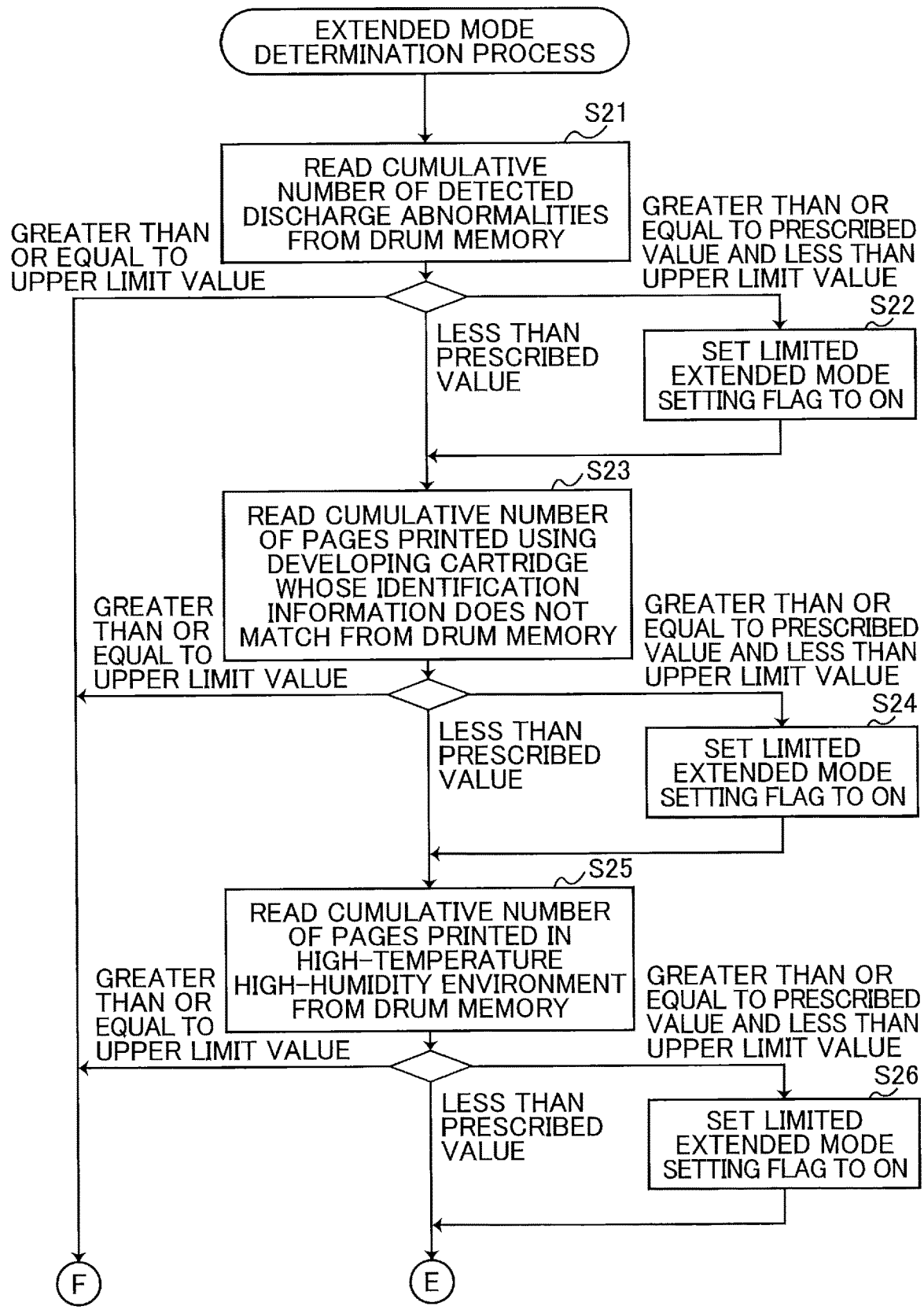
FIG. 9 is a flowchart illustrating steps in an extended mode determination process executed by the controller of the image-forming device according to the embodiment of the present disclosure.
Figure 10:
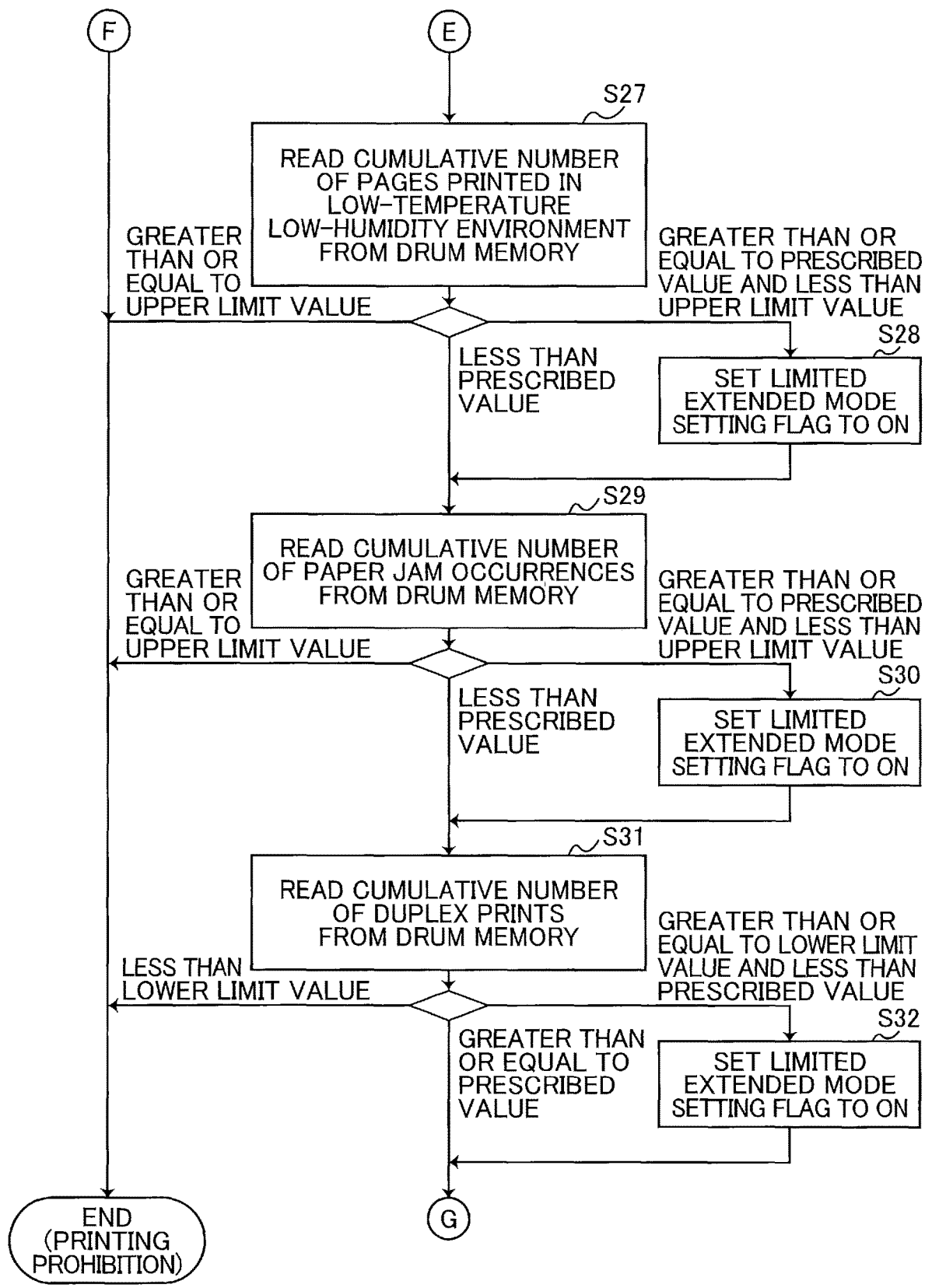
FIG. 10 is a flowchart illustrating steps in a continuation of the extended mode determination process illustrated in FIG. 9.
Figure 11:
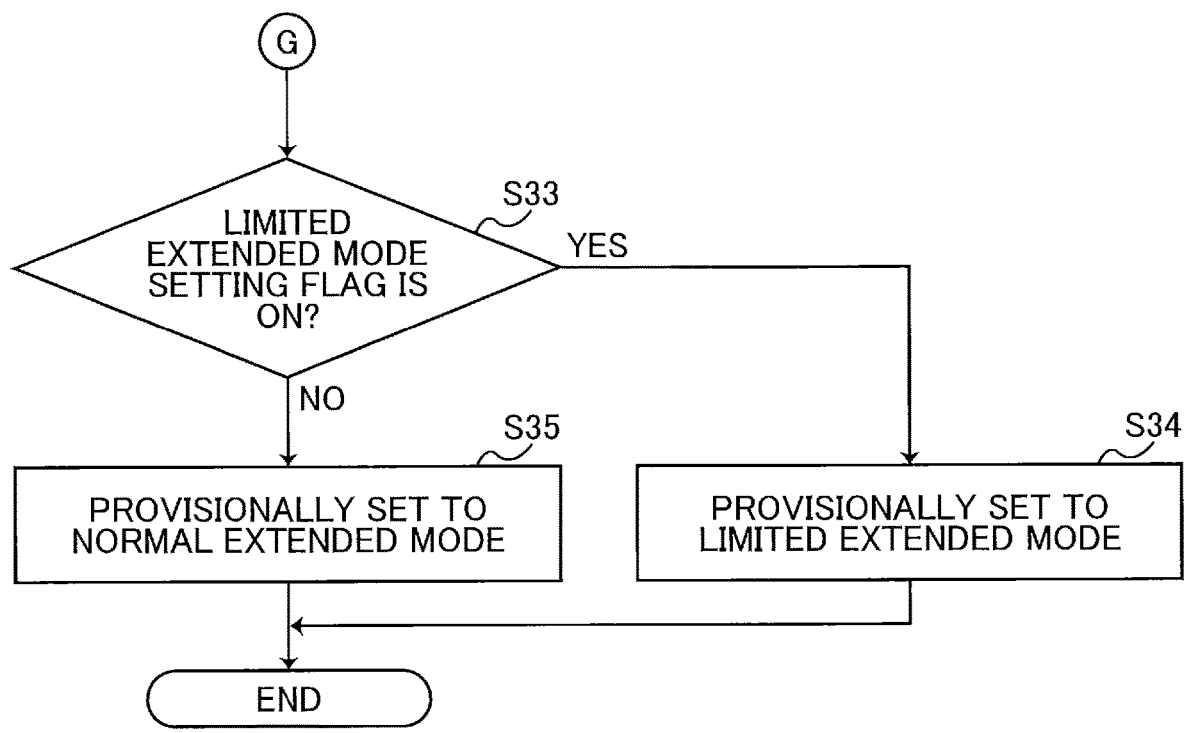
FIG. 11 is a flowchart illustrating steps in a continuation of the extended mode determination process illustrated in FIG. 10.

Next, the extended mode determination process executed by the controller 80 will be described with reference to FIGS. 9 through 11. FIGS. 9 through 11 are flowcharts illustrating steps in the extended mode determining process executed by the controller 80.

To begin, in step S21 the controller 80 reads the cumulative number of detected discharge abnormalities in the charger 24 that charges the photosensitive drum 21 from the drum memory 22. If the cumulative number of discharge abnormalities read in S21 is greater than or equal to an upper limit value, the controller 80 prohibits execution of printing processes (nonprintable mode: nonprintable mode determination process). Put another way, the mode of the printing process is not set to any extended mode because it is not preferable to use a drum cartridge 20 past the end-of-life when the drum cartridge 20 experiences frequent discharge abnormalities. However, if the cumulative number of discharge abnormalities read in step S21 is greater than or equal to a prescribed value and less than the upper limit value, in step S22 the controller 80 sets a limited extended mode setting flag to ON. Alternatively, when the cumulative number of discharge abnormalities in S21 is less than the prescribed value, the controller 80 shifts directly to step S23 to evaluate the magnitude of another parameter that affects the life of the photosensitive drum 21. Step S21 and the process for evaluating the magnitude of the parameter read at this time correspond to the "determination process" in the present embodiment.

Next, in step S23 the controller 80 reads the cumulative number of pages printed using a developing cartridge 30 whose identification information does not match prescribed information from the drum memory 22. If the cumulative number of printed pages read in step S23 is greater than or equal to an upper limit value, the controller 80 prohibits execution of the printing process (nonprintable mode: nonprintable mode determination process). Put another way, the mode of the printing process is not set to any extended mode because the potential for damage to the photosensitive drum 21 is unpredictable when using a drum cartridge 20 from an unknown manufacturer in a printing process, for example. On the other hand, if the cumulative number of printed pages read in step S23 is greater than or equal to the prescribed value and less than the upper limit value, in step S24 the controller 80 sets the limited extended mode setting flag to ON. Alternatively, when the cumulative number of pages read in step S23 is less than the prescribed value, the controller 80 shifts directly to step S25 in order to evaluate the magnitude of another parameter that affects the life of the photosensitive drum 21. Step S23 and the process for evaluating the magnitude of the parameter read at this time correspond to the "determination process" in the present embodiment.

Next, in step S25 the controller 80 reads the cumulative number of pages printed in a high-temperature high-humidity environment from the drum memory 22. When the cumulative number of printed pages read in step S25 is greater than or equal to an upper limit value, the controller 80 prohibits execution of the printing process (nonprintable mode: nonprintable mode determination process). Put another way, the mode of the printing process is not set to any extended mode because deterioration of the photosensitive drum 21 could progress when using the drum cartridge 20 for printing processes in a high-temperature high-humidity environment. On the other hand, when the cumulative number of printed pages read in step S25 is greater than or equal to the prescribed value and less than the upper limit value, in step S26 the controller 80 sets the limited extended mode setting flag to ON. Alternatively, when the cumulative number of printed pages read in step S25 is less than the prescribed value, the controller 80 shifts directly to step S27 (see FIG. 10) in order to evaluate the magnitude of another parameter that affects the life of the photosensitive drum 21. Step S25 and the process for evaluating the magnitude of the parameter read at this time correspond to the "determination process" in the present embodiment.

Next, in step S27 the controller 80 reads the cumulative number of pages printed in a low-temperature low-humidity environment from the drum memory 22. If the cumulative number of printed pages read in step S27 is greater than or equal to an upper limit value, the controller 80 prohibits execution of the printing process (nonprintable mode: nonprintable mode determination process). Put another way, the mode of the printing process is not set to any extended mode because deterioration of the photosensitive drum 21 could progress when using the drum cartridge 20 for printing processes in a low-temperature low-humidity environment. On the other hand, when the cumulative number of printed pages read in step S27 is greater than or equal to the prescribed value and less than the upper limit value, in step S28 the controller 80 sets the limited extended mode setting flag to ON. Further, when the cumulative number of printed pages read in step S27 is less than the prescribed value, the controller 80 shifts directly to step S29 to evaluate the magnitude of another parameter that affects the life of the photosensitive drum 21. Step S27 and the process for evaluating the magnitude of the parameter read at this time correspond to the "determination process" in the present embodiment.

Next, in step S29 the controller 80 reads the cumulative number of paper jam occurrences from the drum memory 22. When the cumulative number of paper jam occurrences read in step S29 is greater than or equal to an upper limit value, the controller 80 prohibits execution of the printing process (nonprintable mode: nonprintable mode determination process). Put another way, the mode of the printing process is not set to any extended mode because deterioration of the photosensitive drum 21 could progress if paper jams occur frequently. On the other hand, when the cumulative number of paper jam occurrences read in step S29 is greater than or equal to the prescribed value and less than the upper limit value, in step S30 the controller 80 sets the limited extended mode setting flag to ON. Further, when the cumulative number of paper jam occurrences read in step S29 is less than the prescribed value, the controller 80 shifts directly to step S31 in order to evaluate the magnitude of another parameter that affects the life of the photosensitive drum 21. Step S29 and the process for evaluating the magnitude of the parameter read at this time correspond to the "determination process" in the present embodiment.

Next, in step S31 the controller 80 reads the cumulative number of duplex prints from the drum memory 22. When the cumulative number of duplex prints read in step S31 is less than a lower limit value, the controller 80 prohibits execution of the printing process (nonprintable mode: nonprintable mode determination process). Put another way, the mode of the printing process is not set to any extended mode because deterioration of the photosensitive drum 21 could easily progress since a larger amount of paper dust is generated when the number of simplex prints is large. On the other hand, when the cumulative number of duplex prints read in step S31 is greater than or equal to the lower limit value and less than the prescribed value, in step S32 the controller 80 sets the limited extended mode setting flag to ON. Further, when the cumulative number of duplex prints read in step S31 is greater than or equal to the prescribed value, the controller 80 shifts directly to the ensuing process in steps S33 through S35 (see FIG. 11) in order to determine an extended mode by considering all results of evaluating parameters to this point.

In step S33 the controller 80 determines whether the limited extended mode setting flag is ON as a result of the plurality of determination processes executed to this point. When the limited extended mode setting flag is ON (step S33: YES), in step S34 the controller 80 provisionally sets the mode of the printing process to the limited extended mode. Specifically, the controller 80 writes information to the device memory 82 for provisionally setting the mode of the printing process to the limited extended mode. Note that the limited extended mode controls the charger 24 to apply a charge bias lower than the normal charge bias and controls the conveying mechanism described above to convey printing paper at a slower feeding speed than the normal feeding speed when a print request is issued.

However, when the limited extended mode setting flag is OFF (step S33: NO), in step S35 the controller 80 provisionally sets the mode of the printing process to a normal extended mode. Specifically, the controller 80 writes information to the device memory 82 provisionally setting the mode of the printing process to the normal extended mode. Note that the normal extended mode controls the charger 24 to apply the same charge bias used in the normal printing mode and controls the conveying mechanism to convey printing paper at the same feeding speed used in the normal printing mode.

<1-2-5. Continuation of the Drum Operating Mode Setting Process>

Figure 6:
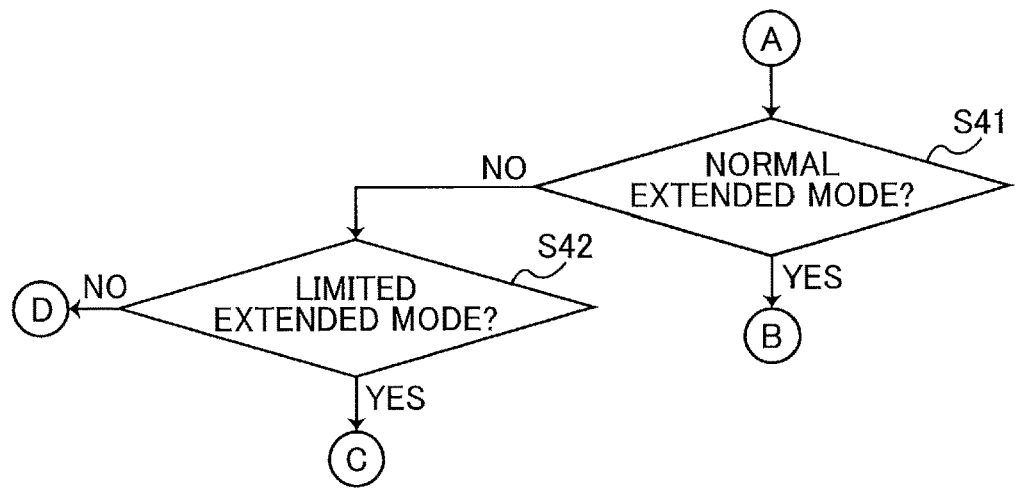
FIG. 6 is a flowchart illustrating steps in a continuation of the drum operating mode setting process illustrated in FIG. 5.
Figure 7:
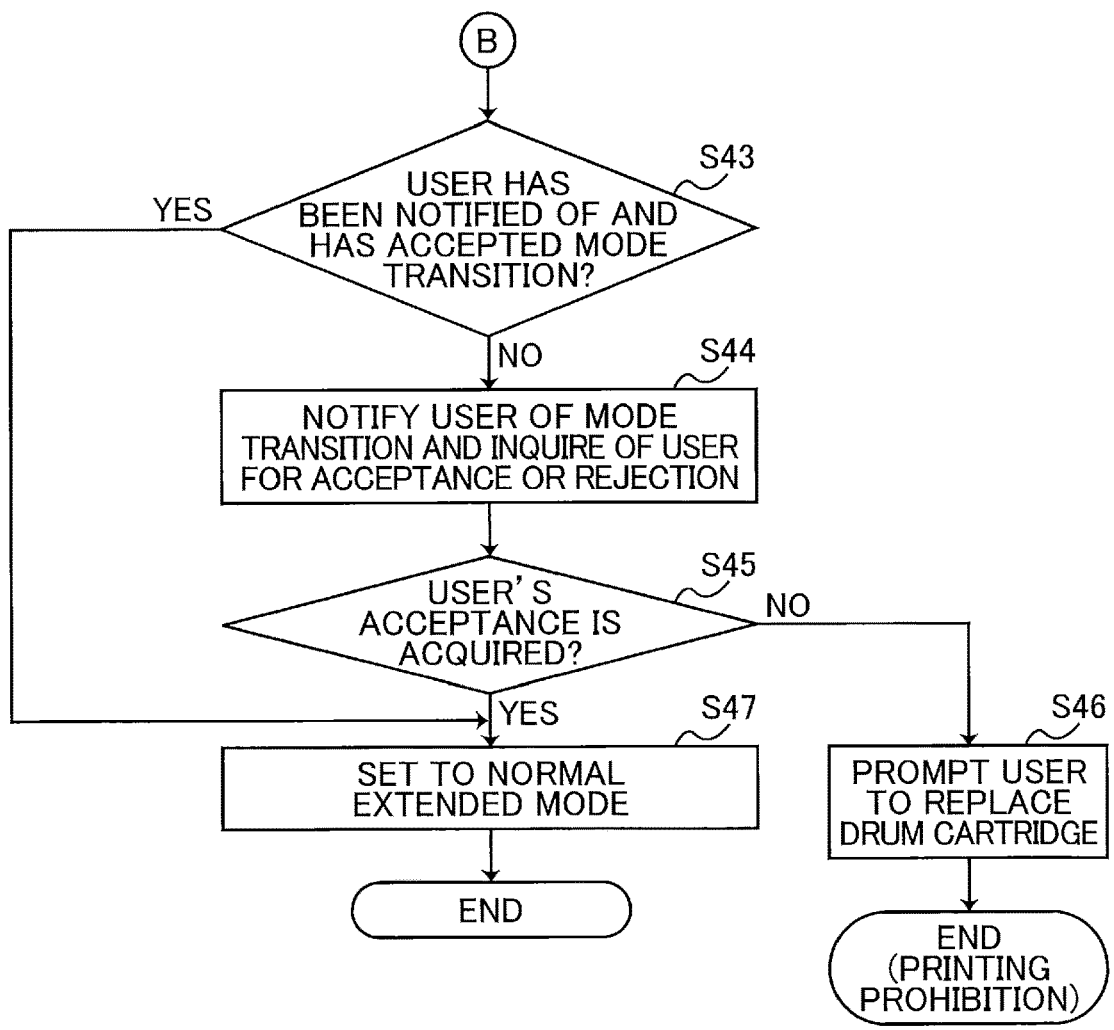
FIG. 7 is a flowchart illustrating steps in a continuation of the drum operating mode setting process illustrated in FIG. 6.
Figure 8:
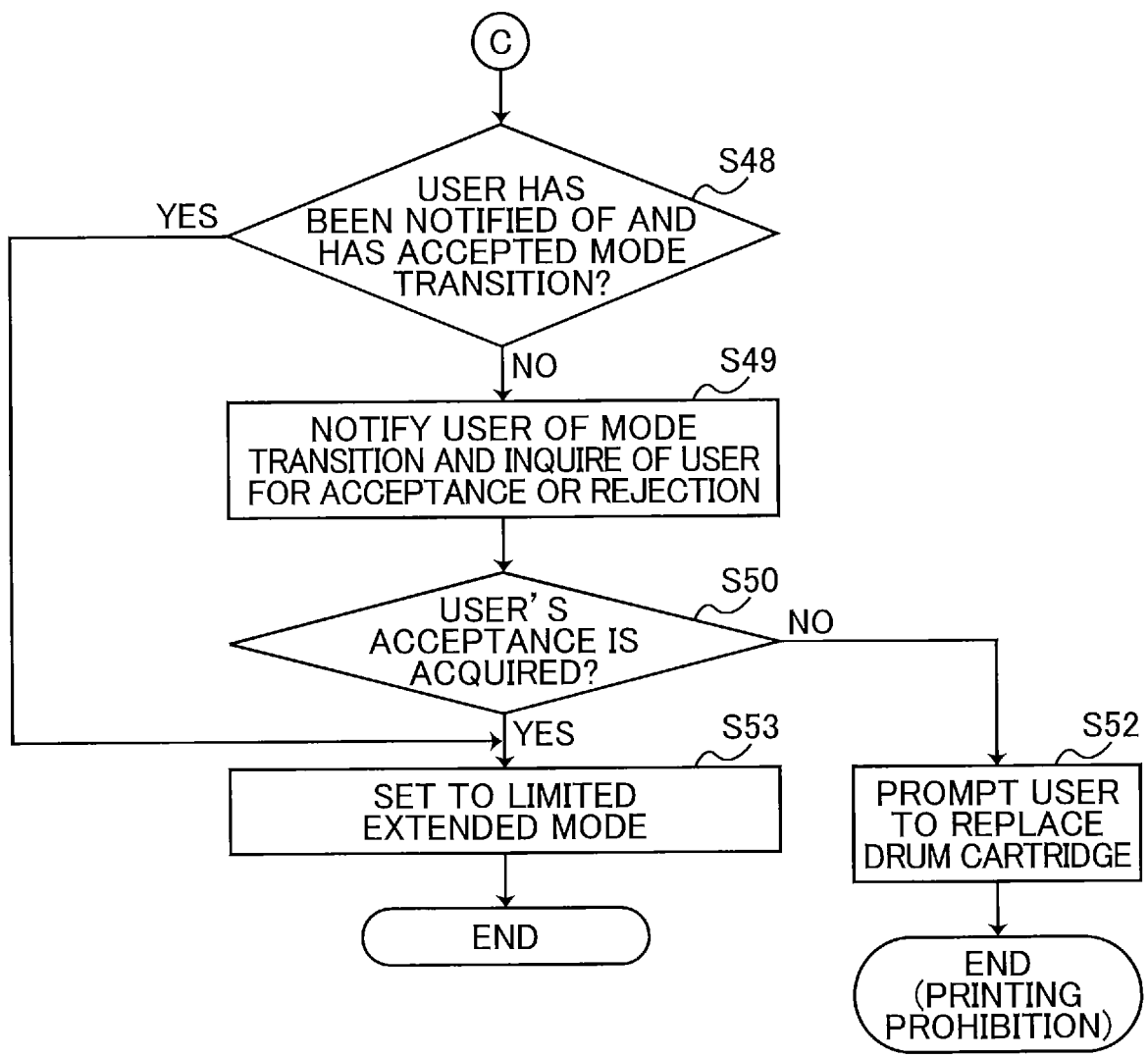
FIG. 8 is a flowchart illustrating steps in a continuation of the drum operating mode setting process illustrated in FIG. 6.

Next, a continuation of the drum operating mode setting process will be described with reference to FIGS. 6 through 8. FIG. 6 is a flowchart illustrating steps in a continuation of the process in FIG. 5. FIGS. 7 and 8 are flowcharts illustrating steps in continuations of the process in FIG. 6.

After completing the extended mode setting process described above, in step S41 the controller 80 determines whether the mode of the printing process is provisionally set to the normal extended mode. When the mode of the printing process is provisionally set to the normal extended mode (step S41: YES), the controller 80 shifts to the continuation of the process illustrated in FIG. 7. However, when the mode of the printing process is not provisionally set to the normal extended mode (step S41: NO), in step S42 the controller 80 determines next whether the mode of the printing process is provisionally set to the limited extended mode. When the mode of the printing process is provisionally set to the limited extended mode (step S42: YES), the controller 80 shifts to the continuation of the process illustrated in FIG. 8. However, when the mode of the printing process is not provisionally set to the limited extended mode (step S42: NO), in step S16 the controller 80 prohibits execution of the printing process and prompts the user to replace the drum cartridge 20. In other words, the conditions for extending the life of the drum cartridge 20 are not met in this case. Consequently, the controller 80 notifies the user that the drum cartridge 20 must be replaced, without extending the life of the drum cartridge 20.

Next, the series of processes illustrated in FIG. 7 will be described. When the mode of the printing process is provisionally set to the normal extended mode, in step S43 the controller 80 determines whether the user has already been notified of the intention to transit to the normal extended mode and whether acceptance has already been acquired from the user. Specifically, the controller 80 determines whether the user has performed an operation in step S45 executed previously to allow this mode transition (step S45: YES) by referencing information stored in the device memory 82. When the user has not yet been notified of the intention to transit to the normal extended mode (step S43: NO), in step S44 the controller 80 notifies the user of the intention to transit to the normal extended mode and inquires of the user for acceptance or rejection. Specifically, in step S45 the controller 80 displays a specific screen on the display 90, such as the screen illustrated in FIG. 13, to notify the user that the mode will be switched to the normal extended mode and to prompt the user to select acceptance or rejection (user selection reception process).

When the controller 80 acquires the user's acceptance as a result of the process in steps S44 and S45 (step S45: YES), in step S47 the controller 80 sets the mode of the printing process to the normal extended mode. Specifically, the controller 80 writes information indicating the normal extended mode to the device memory 82. However, when the user's acceptance is not acquired as a result of the process in step S45 (step S45: NO), in step S46 the controller 80 prohibits execution of the printing process and prompts the user to replace the drum cartridge 20. Specifically, the controller 80 displays a specific screen on the display 90 to notify the user that the drum cartridge 20 must be replaced.

Further, when the controller 80 notifies the user of the intention to transit the mode to the normal extended mode and acquires acceptance from the user during a previous execution of the life management module (step S43: YES), in step S47 the controller 80 sets the mode of the printing process to the normal extended mode without notifying or inquiring of the user again.

Next, the series of processes illustrated in FIG. 8 will be described. When the mode of the printing process is provisionally set to the limited extended mode, in step S48 the controller 80 determines whether the user has already been notified of the intention to transit to the limited extended mode and whether acceptance has already been acquired from the user. Specifically, the controller 80 determines whether the user has performed an operation in step S50 executed previously to allow this mode transition (step S50: YES) by referencing information stored in the device memory 82. When the user has not yet been notified of the intention to transit to the limited extended mode (step S48: NO), in step S49 the controller 80 notifies the user of the intention to transit to the limited extended mode and inquires of the user for acceptance or rejection. Specifically, in step 50 the controller 80 displays a specific screen similar to that illustrated in FIG. 13 on the display 90 to notify the user that the mode will be switched to the limited extended mode and to prompt the user to select acceptance or rejection (user selection reception process).

When the controller 80 acquires the user's acceptance as a result of the process in steps S49 and S60 (step S50: YES), in step S53 the controller 80 sets the mode of the printing process to the limited extended mode. Specifically, the controller 80 writes information indicating the limited extended mode to the device memory 82. However, when the user's acceptance is not acquired as a result of the process in step S50 (step S50: NO), in step S52 the controller 80 prohibits execution of the printing process and prompts the user to replace the drum cartridge 20. Specifically, the controller 80 displays a specific screen on the display 90 to notify the user that drum cartridge 20 must be replaced.

Further, when the controller 80 notifies the user of the intention to transit the mode to the limited extended mode and acquires acceptance from the user during a previous execution of the life management module (step S48: YES), in step S53 the controller 80 sets the mode of the printing process to the limited extended mode without notifying or inquiring of the user again.

<1-2-6. Printing Process>

Figure 12:
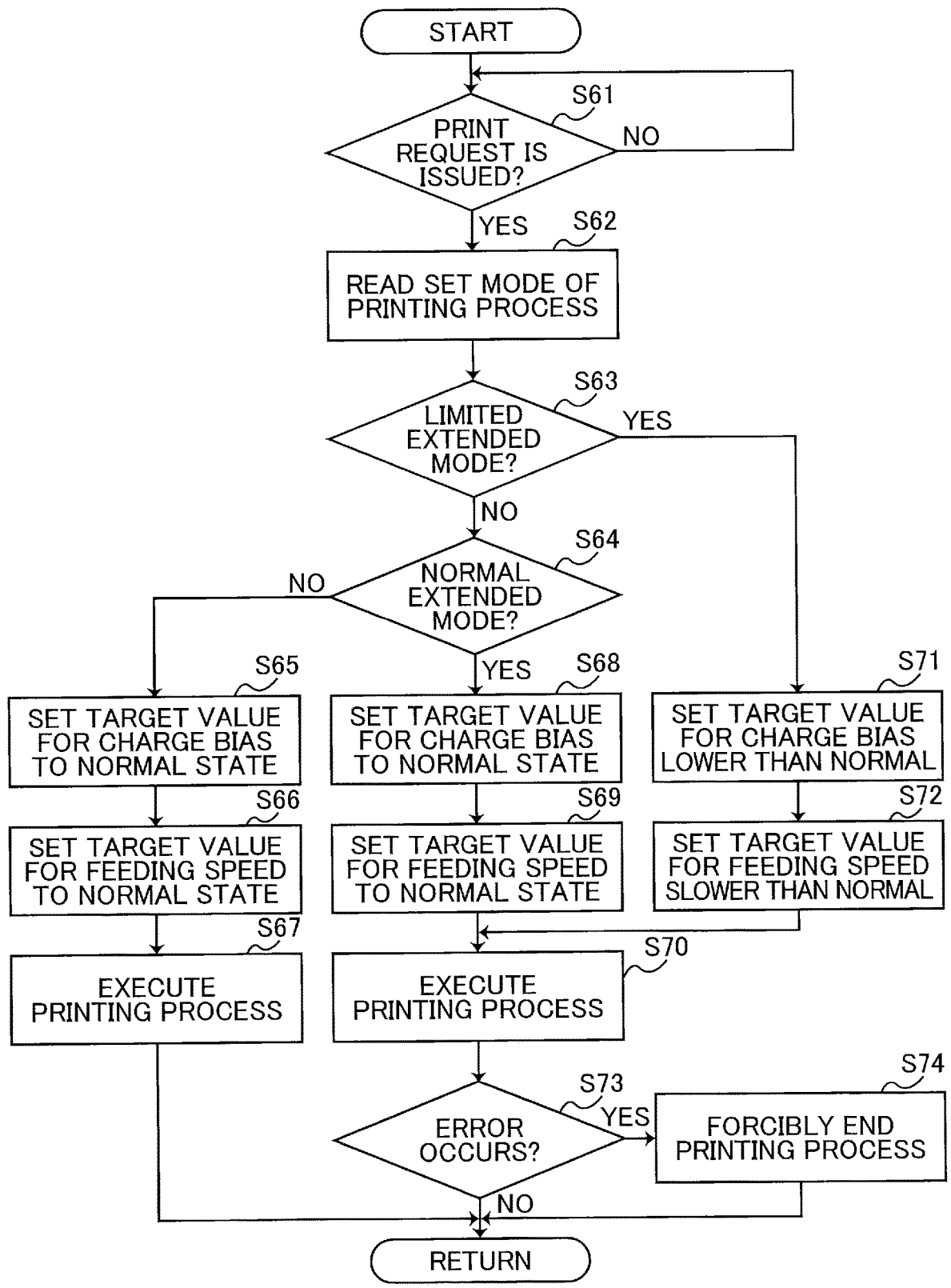
FIG. 12 is a flowchart illustrating steps in a printing process executed by the controller of the image-forming device according to the embodiment of the present disclosure.
Figure 13:
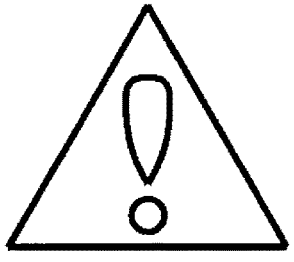
FIG. 13 illustrates an example of a selection screen displayed on a display of the image-forming device when a user selection reception process is executed by the controller of the image-forming device according to the embodiment of the present disclosure.

Next, a printing process executed by the controller 80 will be described with reference to FIG. 12. FIG. 12 is a flowchart illustrating steps in the printing process executed by the controller 80.

To begin, in step S61 the controller 80 determines whether a print request is issued (print request reception process). When a print request has been issued (step S61: YES), in step S62 the controller 80 reads the mode set as the mode of the printing process from the device memory 82.

When the mode of the printing process read in step S62 is not the limited extended mode (step S63: NO) and is not the normal extended mode (step S64: NO), the controller 80 executes the printing process in the normal printing mode according to the process in steps S65 through S67. Specifically, in step S65 the controller 80 sets the target value for the charge bias to be applied by the charger 24 to the normal state and supplies power to the charger 24. Further, in step S66 the controller 80 sets the target value for the feeding speed by which the conveying mechanism is to feed the printing paper to the normal state and activates the conveying mechanism. In these states, in step S67 the controller 80 controls the image-forming device 1 to execute the printing process.

When the mode of the printing process acquired in S62 is the normal extended mode (step S64: YES), the controller 80 executes the printing process in the normal extended mode according to the process in steps S68 through S70. Specifically, in step S68 the controller 80 sets the target value for the charge bias to be applied by the charger 24 to the normal state and supplies power to the charger 24. Further, in step S69 the controller 80 sets the target value for the feeding speed by which the conveying mechanism is to feed printing paper to the normal state and activates the conveying mechanism. In these states, in step S70 the controller 80 controls the image-forming device 1 to execute the printing process (extended printing command process). However, when a discharge error or other prescribed error occurs while executing the printing process in step S70 (step S73: YES), in step S74 the controller 80 forcibly ends the printing process. In this way, the controller 80 immediately prohibits printing when a prescribed error is detected while executing the printing process in the normal extended mode to extend the life of the drum cartridge 20. As a result, safety can be enhanced.

When the mode of the printing process acquired in step S62 is the limited extended mode (step S63: YES), the controller 80 executes the printing process in the limited extended mode according to the process in steps S71, S72, and S70. Specifically, in step S71 the controller 80 sets the target value for the charge bias to be applied by the charger 24 lower than normal (half of the value used in the normal printing mode in the present embodiment) and supplies power to the charger 24. Additionally, in step S72 the controller 80 sets the target value for the feeding speed at which the conveying mechanism will feed the printing paper slower than normal (half of the speed used in the normal printing state in the present embodiment) and activates the conveying mechanism. In these states, in step S70 the controller 80 controls the image-forming device 1 to execute the printing process. Thus, although the printing process is performed by applying a lower charge bias than in the normal printing mode, the quality of the printed image is unlikely to deteriorate since the conveying speed is set slower than the normal printing mode. However, if a discharge error or other prescribed error occurs while the controller 80 is executing the printing process in step S70 (step S73: YES), the controller 80 forcibly ends the printing process (step S74). In this way, the controller 80 can immediately disable printing when a prescribed error is detected while executing a printing process in the limited extended mode to extend the life of the drum cartridge 20. As a result, safety can be enhanced.

As described above, the image-forming device 1 according to the present embodiment includes the frame 11, the drum cartridges 20, the developing cartridges 30, and the controller 80. The controller 80 can execute the drum replacement necessity determination process, and the mode switch process to switch the mode of the printing process between the normal printing mode and the extended printing mode. Thus, even after replacement of the drum cartridge 20 becomes necessary, printing processes can be continued without replacing the drum cartridge 20 as long as the developing cartridge 30 attached to the frame 11 at the time of reaching the end-of-life continues to be used. Put another way, while the same developing cartridge 30 is being used before and after the drum cartridge 20 reaches the end-of-life, printing processes can be continued to extend the life of the drum cartridge 20. As a result, operations for replacing the drum cartridge 20 and the developing cartridge 30 can be performed at the same time, and the drum cartridge 20 and the developing cartridge 30 needed for replacement can be ordered at the same time, thereby reducing the user's labor and burden, as well as shipping costs. Further, since the drum cartridge 20 and the developing cartridge 30 can be ordered at the same time, shipping costs can be reduced.

The image-forming device 1 can also execute the toner identification information acquisition process, the latest toner identification information acquisition process, and the extended printing mode possibility determination process. Thus, using the toner identification information read from the toner memory 32, the image-forming device 1 can easily learn whether the same developing cartridge 30 is being used before and after the drum cartridge 30 reaches the end-of-life.

Further, in the extended printing mode possibility determination process performed by the controller 80, the controller 80 allows the extended printing mode to be set when there is no change in the toner identification information for the developing cartridge 30 attached to the frame 11 in a state where the drum cartridge 20 must be replaced. However, the controller 80 does not allow the extended printing mode to be set in the extended printing mode possibility determination process when there is a change in the toner identification information for the developing cartridge 30 attached to the frame 11 in a state where the drum cartridge 20 must be replaced. Thus, when the developing cartridge 30 attached to the frame 11 is replaced after the drum cartridge 20 reaches the end-of-life, printing is disabled according to the perspective that further extending use of a drum cartridge 20 that has already exceeded its life is not desirable. Accordingly, the controller 80 can prevent a drop in printing quality caused when using the drum cartridge 20 far past its end-of-life.

Further, the controller 80 can also execute the user selection reception process. By prompting the user to select whether to allow a transition to the extended printing mode, the controller 80 can operate the image-forming device 1 according to the user's wishes.

The extended printing mode of the present embodiment also includes a normal extended mode and a limited extended mode. The controller 80 can execute the determination processes for evaluating the magnitudes of parameters that affect the life of the photosensitive drum 21. When the controller 80 determines that a first condition is met through the determination process, the controller 80 sets the mode of the printing process to the normal extended mode. However, when the controller 80 determines that a second condition, different from the first condition, is met through the determination processes, the controller 80 sets the mode of the printing process to the limited extended mode. Thus, the controller 80 can switch the mode of the printing process between the normal extended mode and the limited extended mode according to the situation. Accordingly, the controller 80 can suppress a drop in printing quality caused when using the drum cartridge 20 past its end-of-life.

The first condition and the second condition described above are related to at least one of the number of detected discharge abnormalities in the charger 24 that charges the photosensitive drum 21, the number of pages printed using a developing cartridge 30 whose identification information does not match prescribed information, the number of pages printed in a high-temperature high-humidity environment, the number of pages printed in a low-temperature low-humidity environment, the number of paper jam occurrences, and the number of duplex prints. In this way, the controller 80 can set a suitable extended mode for printing based on the magnitudes of parameters that affect the life of the drum cartridge 20.

The present specification also discloses a program that controls the controller 80 provided in the image-forming device 1, or an external controller, to execute the drum replacement necessity determination process and the mode switch process.

The present specification also discloses an image-forming method capable of controlling the image-forming device 1 to perform printing processes according to a set mode. In the image-forming method, the image-forming device 1 a) determines whether a drum cartridge 20 must be replaced based on the life information for the drum cartridge 20, and b) switches the mode of the printing process between the normal printing mode and extended printing mode based on conditions.

An embodiment of the present disclosure has been described above. However, the present disclosure is not limited to this embodiment, and the embodiment described above may be modified in various ways.

2. First Modification

Each time the controller 80 is about to switch to the extended printing mode in the embodiment described above, the controller 80 inquire of the user whether or not to allow the mode transition (user selection reception process). However, the controller 80 may perform a user preset reception process in place of the user selection reception process prior to executing a printing process. In the user preset reception process, the controller 80 prompts the user to uniformly set in advance whether or not to allow a transition to the extended printing mode when the toner identification information for the developing cartridge 30 attached to the frame 11 does no change in a state where the drum cartridge 20 must be replaced. Specifically, the controller 80 displays a selection screen such as that illustrated in FIG. 14 on the display 90 in the user preset reception process. In the example of FIG. 14, the user uniformly sets whether or not to allow a transition to extended modes by selecting one of "ON" and "OFF" in the selection screen according to a checkbox format.

3. Second Modification

In the embodiment described above, the controller 80 determines whether or not toner identification information acquired in the toner identification information acquisition process matches toner identification information read in the latest toner identification information acquisition process (extended printing mode possibility determination process). However, the controller 80 may instead perform the following process. Specifically, in place of the toner identification information acquisition process, the controller 80 may sequentially store identification information for developing cartridges 30 attached to the frame 11 in the device memory 82. In this case, the controller 80 may reference the history of toner identification information stored in the device memory 82 in the extended printing mode possibility determination process and determine whether this history matches the toner identification information read in the latest toner identification information acquisition process.

4. Third Modification

Instead of determining whether a developing cartridge 30 has been replaced with a new cartridge based on read toner identification information, the controller 80 may perform a process such as that described below. Specifically, the controller 80 may detect that a developing cartridge 30 is a "new product" using a mechanical method and may store the cumulative number of detected new products in memory. After the replacement time flag for a developing cartridge 30 is set to ON, the controller 80 continues to extend the life of the drum cartridge 20 and allow printing processes to be performed while the cumulative number of detected new products is not increased. When the detected number of new products increases after the replacement time flag for a drum cartridge 20 is set to ON, the controller 80 prohibits printing.

5. Fourth Modification

In place of or in addition to the process described above, the controller 80 may perform a process for prompting the user to set an upper limit value for the number of printed pages in the extended printing mode.

6. Fifth Modification

When totaling the cumulative number of paper jam occurrences, the controller 80 may include only those paper jams that occur at positions adversely affecting the life of the photosensitive drum 21 and may use this cumulative number to determine whether the first condition or the second condition is met.

7. Sixth Modification

In the present embodiment described above, the processor 81 provided in the main body of the image-forming device 1 performs the drum replacement necessity determination process, the mode switch process, the toner identification information acquisition process, the latest toner identification information acquisition process, the extended printing mode possibility determination process, the user selection reception process, the print request reception process, the extended printing command process, the determination process, and the extended mode determination process, but the present disclosure is not limited to this configuration. That is, the drum cartridge 20 may include a drum-side processor, for example, and the drum-side processor may perform the various processes described above. Alternatively, the various processes described above may be performed by a driver in a computer external to the image-forming device 1 or a CPU built into a wireless communication terminal such as a smartphone and the like.

8. Seventh Modification

Figure 15:
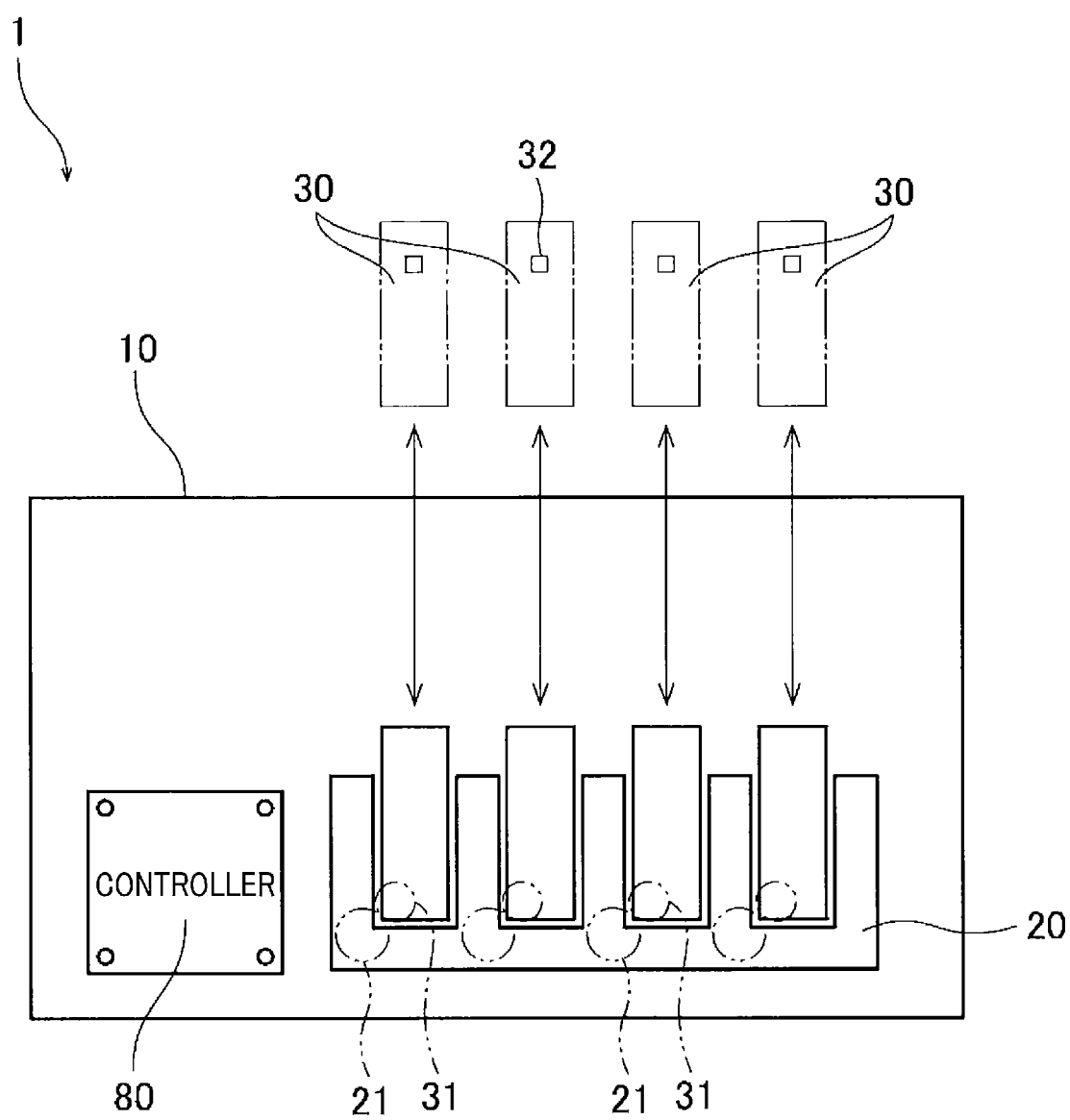
FIG. 15 is a schematic diagram of an image-forming device according to a seventh modification of the present disclosure.

In the present embodiment described above, the drum cartridge 20 and the developing cartridge 30 form a pair of cartridges, and a pair of cartridges for each color is attached to the frame 11. However, as an alternative, a developing cartridge 30 for each color may be attached to a common drum cartridge 20, as illustrated in FIG. 15. When the replacement time for the drum cartridge arrives, the drum cartridge 20 having photosensitive drums 21 for all colors may be replaced altogether with a new cartridge. When the aspect of the present application is applied to an image-forming device with this configuration, the controller performs a process such as that described below. That is, when a plurality of photosensitive drums 21 has reached their replacement time and include a mixture of photosensitive drums 21 that satisfy the first condition and photosensitive drums 21 that satisfy the second condition, the controller sets the mode of the printing process to the limited extended mode when even one of the photosensitive drums 21 satisfies the second condition.

In the examples described in the present embodiment, the developing cartridge includes a developing roller, but the developing cartridge used in the embodiment need not include a developing roller. In this case, the developing roller may be provided in the drum cartridge.

In the present embodiment, one drum cartridge 20 is provided for each developing cartridge 30. However, a drawer having four photosensitive drums 21 (drawer cartridge) may include a single drum memory 22. In this case, four developing cartridges 30 can be attached to the drawer. Specifically, developing cartridges 30 corresponding to respective ones of four photosensitive drums 21 can be attached to the drawer. Here, the drum memory 22 stores information related to the drum cartridge described above for each of the four photosensitive drums 21.

Further, the details of the structures and processes for the image-forming device may be suitably modified without departing from the spirit of the present disclosure. For example, the number of determination processes may be greater or less than the number described above. Further, components described above in the present embodiment and its modifications may be combined in any way that does not produce inconsistencies.

What is claimed is:
1. An image-forming device comprising:
a frame;
a drum cartridge detachably attached to the frame, the drum cartridge having a photosensitive drum;
a developing cartridge detachably attached to the frame, the developing cartridge having a housing configured to accommodate therein toner; and
a controller configured to control the image-forming device to perform a printing process, the controller being configured to perform:
a drum replacement necessity determination process to determine, based on life information for the drum cartridge, whether replacement of the drum cartridge is necessary;
a mode switch process to switch a mode of the printing process between a normal printing mode and an extended printing mode, the normal printing mode allowing the image-forming device to perform the printing process when the replacement of the drum cartridge is determined to be unnecessary in the drum replacement necessity determination process, the extended printing mode allowing the image-forming device to perform the printing process on a condition that the developing cartridge attached to the frame is not replaced with another developing cartridge in a state where the replacement of the drum cartridge is necessary; and a toner identification information acquisition process to acquire and store toner identification information when the replacement of the drum cartridge is determined to be necessary in the drum replacement necessity determination process, the toner identification information capable of identifying the developing cartridge attached to the frame, and wherein the mode switch process switches the mode of the printing process to the extended printing mode when the controller determines that there is no change in the toner identification information for the developing cartridge attached to the frame in a state where the replacement of the drum cartridge is necessary.

2. The image-forming device according to claim 1, wherein the controller comprises a processor provided in a main body of the image-forming device.

3. The image-forming device according to claim 1, wherein the developing cartridge comprises a toner memory configured to store the toner identification information, and wherein the toner identification information acquisition process acquires the toner identification information from the toner memory.

4. The image-forming device according to claim 3, wherein the toner identification information acquisition process acquires the toner identification information from the toner memory when the replacement of the drum cartridge is determined to be necessary in the drum replacement necessity determination process, and wherein the controller is configured to further perform:
a latest toner identification information acquisition process to acquire from the toner memory the toner identification information for the developing cartridge attached to the frame after the toner identification information acquisition process is performed; and an extended printing mode possibility determination process to allow the extended printing mode to be set when the toner identification information acquired in the toner identification information acquisition process matches the toner identification information acquired in the latest toner identification information acquisition process.

5. The image-forming device according to claim 1, wherein the controller is configured to further perform:
an extended printing mode possibility determination process to determine whether the extended printing mode is allowed to be set, the extended printing mode possibility determination process allowing the extended printing mode to be set when there is no change in the toner identification information for the developing cartridge attached to the frame in a state where the replacement of the drum cartridge is necessary, the extended printing mode possibility determination process not allowing the extended printing mode to be set when there is a change in the toner identification information for the developing cartridge attached to the frame in a state where the replacement of the drum cartridge is necessary.

6. The image-forming device according to claim 5, wherein the controller is configured to further perform:
a user selection reception process to inquire of user whether to allow a mode transition to the extended printing mode when there is no change in the toner identification information for the developing cartridge attached to the frame in a state where the replacement of the drum cartridge is necessary.

7. The image-forming device according to claim 5, wherein the controller is configured to further perform:
a user preset reception process to prompt a user to uniformly set in advance whether to allow a mode transition to the extended printing mode when there is no change in the toner identification information for the developing cartridge attached to the frame in a state where the replacement of the drum cartridge is necessary.

8. The image-forming device according to claim 1, further comprising a conveying mechanism configured to convey printing paper,
wherein the drum cartridge comprises a charger configured to charge a surface of the photosensitive drum, and
wherein the controller is configured to further perform:
a print request reception process to receive a print request; and an extended printing command process to control the charger to apply a charging bias same as a charging bias in the normal printing mode and control the conveying mechanism to convey the printing paper at a feeding speed same as a feeding speed in the normal printing mode to control the image-forming device to perform the printing process when the print request is received in the print request reception process in a state where the extended printing mode is set.

9. The image-forming device according to claim 1, wherein the extended printing mode includes a normal extended mode and a limited extended mode, the normal extended mode allowing the image-forming device to perform the printing process with a charge bias same as a charge bias in the normal printing mode and a feeding speed same as a feeding speed in the normal printing mode, the limited extended mode allowing the image-forming device to perform the printing process with a charge bias lower than a charge bias in the normal printing mode and a feeding speed slower than a feeding speed in the normal printing mode.

10. The image-forming device according to claim 9, wherein the controller is configured to further perform:
a determination process to evaluate a magnitude of a parameter affecting a life of the photosensitive drum; and an extended mode determination process to set the extended printing mode to one of the normal extended mode and the limited extended mode, the extended mode determination process setting the extended printing mode to the normal extended mode when the determination process determines that a first condition is met, the extended mode determination process setting the extended printing mode to the limited extended mode when the determination process determines that a second condition different from the first condition is met.

11. The image-forming device according to claim 10, wherein each of the first condition and the second condition is related to at least one of a number of detected discharge abnormalities in the charger charging the photosensitive drum, a number of pages printed using the developing cartridge whose identification information does not match prescribed information, a number of pages printed in a high-temperature high-humidity environment, a number of pages printed in a low-temperature low-humidity environment, a number of paper jam occurrences, and a number of duplex prints.

12. The image-forming device according to claim 11, wherein the drum cartridge comprises a drum memory configured to store drum identification information capable of identifying the drum cartridge, wherein the drum memory is configured to store, in association with the drum identification information, at least one of the number of detected discharge abnormalities in the charger, the number of pages printed using the developing cartridge whose identification information does not match the prescribed information, the number of pages printed in the high-temperature high-humidity environment, the number of pages printed in the low-temperature low-humidity environment, the number of paper jam occurrences, and the number of duplex prints.

13. The image-forming device according to claim 9, wherein the controller is configured to further perform:

a determination process to evaluate a magnitude of a parameter affecting a life of the photosensitive drum; and a nonprintable mode determination process to set the mode of the printing process to a nonprintable mode when the determination process determines that a first condition is not met and a second condition different from the first condition is not met, the nonprintable mode prohibiting the image-forming device from performing the printing process.

14. The image-forming device according to claim 1, wherein the drum cartridge is configured to store the life information, the life information indicating at least one of a cumulative number of rotations of the photosensitive drum and a cumulative number of pages printed using the photosensitive drum, and wherein the replacement of the drum cartridge is determined to be necessary in the drum replacement necessity determination process when at least one of: the cumulative number of rotations of the photosensitive drum is greater than or equal to a first threshold value; and the cumulative number of pages printed using the photosensitive drum is greater than or equal to a second threshold value.

15. A non-transitory computer readable storage medium storing computer-readable instructions executed by a controller included in or provided outside an image-forming device, the image-forming device including: a frame; a drum cartridge detachably attached to the frame, the drum cartridge having a photosensitive drum; and a developing cartridge detachably attached to the frame, the developing cartridge having a housing configured to accommodate therein toner, the computer-readable instructions, when executed by the controller, causing the image-forming device to perform a printing process according to a mode, the computer-readable instructions causing the controller to perform:

a drum replacement necessity determination process to determine, based on life information for the drum cartridge, whether replacement of the drum cartridge is necessary;

a mode switch process to switch the mode of the printing process between a normal printing mode and an extended printing mode, the normal printing mode allowing the image-forming device to perform the printing process when the replacement of the drum cartridge is determined to be unnecessary in the drum replacement necessity determination process, the extended printing mode allowing the image-forming device to perform the printing process on a condition that the developing cartridge attached to the frame is not replaced with another developing cartridge in a state where the replacement of the drum cartridge is necessary; and a toner identification information acquisition process to acquire and store toner identification information when the replacement of the drum cartridge is determined to be necessary in the drum replacement necessity determination process, the toner identification information capable of identifying the developing cartridge attached to the frame, and wherein the mode switch process switches the mode of the printing process to the extended printing mode when the controller determines that there is no change in the toner identification information for the developing cartridge attached to the frame in a state where the replacement of the drum cartridge is necessary.

16. A method for controlling an image-forming device to perform a printing process according to a mode, the image-forming device including: a frame; a drum cartridge detachably attached to the frame, the drum cartridge having a photosensitive drum; and a developing cartridge detachably attached to the frame, the developing cartridge having a housing configured to accommodate therein toner, the method comprising:

determining, based on life information for the drum cartridge, whether replacement of the drum cartridge is necessary;

switching the mode of the printing process between a normal printing mode and an extended printing mode, the normal printing mode allowing the image-forming device to perform the printing process when the replacement of the drum cartridge is determined to be unnecessary in the determining, the extended printing mode allowing the image-forming device to perform the printing process on a condition that the developing cartridge attached to the frame is not replaced with another developing cartridge in a state where the replacement of the drum cartridge is necessary; and acquiring and storing toner identification information when the replacement of the drum cartridge is determined to be necessary, the toner identification information capable of identifying the developing cartridge attached to the frame, and wherein switching the mode of the printing process to the extended printing mode occurs in response to the controller determining that there is no change in the toner identification information for the developing cartridge attached to the frame in a state where the replacement of the drum cartridge is necessary.

17. An image-forming device comprising:

a frame;

a drum cartridge detachably attached to the frame, the drum cartridge having a photosensitive drum;

a developing cartridge detachably attached to the frame, the developing cartridge having a housing configured to accommodate therein toner; and a controller configured to control the image-forming device to perform a printing process, the controller being configured to perform:

a drum replacement necessity determination process to determine, based on life information for the drum cartridge, whether replacement of the drum cartridge is necessary; and a mode switch process to switch a mode of the printing process between a normal printing mode and an extended printing mode, the normal printing mode allowing the image-forming device to perform the printing process when the replacement of the drum cartridge is determined to be unnecessary in the drum replacement necessity determination process, the extended printing mode allowing the image-forming device to perform the printing process on a condition that the developing cartridge attached to the frame is not replaced with another developing cartridge in a state where the replacement of the drum cartridge is necessary, wherein the extended printing mode includes a normal extended mode and a limited extended mode, the normal extended mode allowing the image-forming device to perform the printing process with a charge bias same as a charge bias in the normal printing mode and a feeding speed same as a feeding speed in the normal printing mode, the limited extended mode allowing the image-forming device to perform the printing process with a charge bias lower than a charge bias in the normal printing mode and a feeding speed slower than a feeding speed in the normal printing mode.

18. A non-transitory computer readable storage medium storing computer-readable instructions executed by a controller included in or provided outside an image-forming device, the image-forming device including: a frame; a drum cartridge detachably attached to the frame, the drum cartridge having a photosensitive drum; and a developing cartridge detachably attached to the frame, the developing cartridge having a housing configured to accommodate therein toner, the computer-readable instructions, when executed by the controller, causing the image-forming device to perform a printing process according to a mode, the computer-readable instructions causing the controller to perform:

a drum replacement necessity determination process to determine, based on life information for the drum cartridge, whether replacement of the drum cartridge is necessary; and a mode switch process to switch the mode of the printing process between a normal printing mode and an extended printing mode, the normal printing mode allowing the image-forming device to perform the printing process when the replacement of the drum cartridge is determined to be unnecessary in the drum replacement necessity determination process, the extended printing mode allowing the image-forming device to perform the printing process on a condition that the developing cartridge attached to the frame is not replaced with another developing cartridge in a state where the replacement of the drum cartridge is necessary, wherein the extended printing mode includes a normal extended mode and a limited extended mode, the normal extended mode allowing the image-forming device to perform the printing process with a charge bias same as a charge bias in the normal printing mode and a feeding speed same as a feeding speed in the normal printing mode, the limited extended mode allowing the image-forming device to perform the printing process with a charge bias lower than a charge bias in the normal printing mode and a feeding speed slower than a feeding speed in the normal printing mode.

19. A method for controlling an image-forming device to perform a printing process according to a mode, the image-forming device including: a frame; a drum cartridge detachably attached to the frame, the drum cartridge having a photosensitive drum; and a developing cartridge detachably attached to the frame, the developing cartridge having a housing configured to accommodate therein toner, the method comprising:

determining, based on life information for the drum cartridge, whether replacement of the drum cartridge is necessary; and switching the mode of the printing process between a normal printing mode and an extended printing mode, the normal printing mode allowing the image-forming device to perform the printing process when the replacement of the drum cartridge is determined to be unnecessary in the determining, the extended printing mode allowing the image-forming device to perform the printing process on a condition that the developing cartridge attached to the frame is not replaced with another developing cartridge in a state where the replacement of the drum cartridge is necessary, wherein the extended printing mode includes a normal extended mode and a limited extended mode, the normal extended mode allowing the image-forming device to perform the printing process with a charge bias same as a charge bias in the normal printing mode and a feeding speed same as a feeding speed in the normal printing mode, the limited extended mode allowing the image-forming device to perform the printing process with a charge bias lower than a charge bias in the normal printing mode and a feeding speed slower than a feeding speed in the normal printing mode.

* * * * *